(12) United States Patent
Hsieh et al.

(10) Patent No.: US 6,738,595 B2
(45) Date of Patent: May 18, 2004

(54) OXIDIZED TRANSPORT TRANSFER MEMBER ADHESIVES

(75) Inventors: Bing R. Hsieh, Webster, NY (US); T. Edwin Freeman, Webster, NY (US)

(73) Assignee: Xerox Corporation, Stamford, CT (US)

( * ) Notice: Subject to any disclaimer, the term of this patent is extended or adjusted under 35 U.S.C. 154(b) by 59 days.

(21) Appl. No.: 10/013,665

(22) Filed: Dec. 13, 2001

(65) Prior Publication Data

US 2003/0161668 A1 Aug. 28, 2003

(51) Int. Cl.⁷ .................. G03G 15/01; G03G 15/16
(52) U.S. Cl. .................. 399/302; 399/303; 399/308; 399/312

(58) Field of Search ............... 399/303, 308, 399/302, 312

(56) References Cited

U.S. PATENT DOCUMENTS

| 5,571,649 A | * | 11/1996 | Mishra et al. | ............ 430/59 |
| 5,721,032 A | * | 2/1998 | Parker et al. | ............ 428/57 |
| 5,761,595 A | * | 6/1998 | Tarnawskyj et al. | ........ 399/308 |
| 6,067,430 A | * | 5/2000 | Mammino et al. | ......... 399/174 |

* cited by examiner

*Primary Examiner*—Quana M. Grainger
(74) *Attorney, Agent, or Firm*—Annette L. Bade

(57) ABSTRACT

An endless seamed flexible belt comprising a first end and a second end which join together to form a seam, the seam having an adhesive with an oxidized charge transport molecule, a charge transport molecule, or mixtures thereof.

22 Claims, 8 Drawing Sheets

OXIDIZED TRANSPORT TRANSFER MEMBER ADHESIVES

CROSS REFERENCE TO RELATED APPLICATIONS

Attention is directed to U.S. patent application Ser. No. 08/004,636 filed Jan. 8, 1998, entitled "Process and Apparatus for Producing an Endless Seamed Belt;" U.S. patent application Ser. No. 09/470,931 filed Dec. 22, 1999, entitled, "Continuous Process for Manufacturing Imageable Seamed Belts for Printers;" U.S. patent application Ser. No. 09/615,444, filed Jul. 13, 2000, entitled, "Polyimide Adhesive For Polyimide Component Interlocking Seams;" U.S. patent application Ser. No. 09,833,507, filed Apr. 11, 2001, entitled, "Conductive Carbon Filled Polyvinyl Butyral Adhesive;" U.S. patent application Ser. No. 09,833,488, filed Apr. 11, 2001, entitled, "Dual Curing Process for Producing a Puzzle Cut Seam;" U.S. patent application Ser. No. 09,833,546, filed Apr. 11, 2001, entitled, "Imageable Seamed Belts Having Polyamide Adhesive Between Interlocking Seaming Members;" U.S. patent application Ser. No. 09,833,507, filed Apr. 11, 2001, entitled, "Polyamide and Conductive Filler Adhesive;" and U.S. patent application Ser. No. 10/013,652, filed Dec. 13, 2001, entitled "Intermediate Transfer Member Comprising Charged Transport Layer." The disclosures of each of these references are hereby incorporated by reference in their entirety.

BACKGROUND OF THE INVENTION

The present invention is directed to processes for seaming components useful in electrostatographic, including digital, apparatuses. In specific embodiments, the present invention is directed to seaming processes useful for components such as seamed belts, and more specifically, to endless flexible seamed belts wherein an image can be transferred at the seam of the belt with little or no print defects caused by the seam. In embodiments, the present invention relates to processes for seaming xerographic component imagable seamed belts, wherein an adhesive is formed between mutually mating elements of a seam. In embodiments, the process includes two curing steps, and in preferred embodiments, the second cure is at a temperature higher than that of the first cure step. In embodiments, the seam is bonded using a first clamp and a second clamp, wherein the clamps may be heated. In an embodiment, the adhesive between seaming members comprises a resin, such as a hot-melt processable, thermosetting resin, preferably containing electrically conductive filler(s) dispersed or contained therein.

The seam produced by the process herein is strong enough to survive mechanical flexing while under tension, as the belt travels over various diameter rollers. The process herein, in embodiments, provides a seam in which the height differential between the seam and the rest of the belt is virtually nil. The process herein, in embodiments, provides a belt allowing for image transfer at the seam, which cannot be accomplished with known seamed belts. Image transfer is accomplished partly because the process provides a seam that possesses the desired conductivity and release properties required for sufficient transfer. Image transfer is further made possible because the process provides a seam that is virtually or completely free of bubbles, voids, and other inclusions, which may impact high quality image transfer at the seam region and/or reduce the mechanical strength of the seam. The process provides crosslinking of the adhesive into a strong, solid phase interface having the desired conductivity and release properties to function as an imagable seam. The present process, in embodiments, is further easy to control and low cost.

In a typical electrostatographic reproducing apparatus such as an electrophotographic imaging system using a photosensitive member, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

The developed toner image recorded on the imaging member is transferred to an image receiving substrate such as paper via a transfer member. The toner particles may be transferred by heat and/or pressure to a transfer member, or more commonly, the toner image particles may be electrostatically transferred to the transfer member by means of an electrical potential between the imaging member and the transfer member. After the toner has been transferred to the transfer member, it is then transferred to the image receiving substrate, for example by contacting the substrate with the toner image on the transfer member under heat and/or pressure.

Transfer members enable high throughput at modest process speeds. In four-color photocopier or printer systems, the transfer member also improves registration of the final color toner image. In such systems, the four component colors of cyan, yellow, magenta and black may be synchronously developed onto one or more imaging members and transferred in registration onto a transfer member at a transfer station.

In electrostatographic printing and photocopy machines in which the toner image is transferred from the transfer member to the image receiving substrate, it is desired that the transfer of the toner particles from the transfer member to the image receiving substrate be substantially 100 percent. Less than complete transfer to the image receiving substrate results in image degradation and low resolution. Complete transfer is particularly desirable when the imaging process involves generating full color images since undesirable color deterioration in the final colors can occur when the color images are not completely transferred from the transfer member.

Thus, it is desirable that the transfer member surface has excellent release characteristics with respect to the toner particles. Conventional materials known in the art for use as transfer members often possess the strength, conformability and electrical conductivity necessary for use as transfer members, but can suffer from poor toner release characteristics, especially with respect to higher gloss image receiving substrates.

Polyimide substrate transfer members are suitable for high performance applications because of their outstanding mechanical strength and thermal stability, in addition to their good resistance to a wide range of chemicals. However, the high cost of manufacturing unseamed polyimide belts has led to the introduction of a seamed belt.

In the electrostatic transfer applications, use of a seamed transfer polyimide member made by conventional seaming processes results in insufficient transfer in that the developed image occurring on the seam is not adequately transferred.

This incomplete transfer is partially the result of the difference in seam height and the rest of the belt. A "bump" is formed at the seam, thereby hindering transfer and mechanical performance. The development of puzzle cut seams has increased the quality of transfer somewhat, by decreasing the seam height, thereby allowing smooth mechanical cycling. However, even with the improvements made with puzzle cut seams, quality imaging in the seamed area is not obtainable at present due, in part, to contrast in transfer caused by differences in electrical and release properties of known seaming adhesives and known seaming processes. Further, current seaming processes do not provide sufficient bonding strength at the seam, resulting in short belt life. In addition, the seam must have the appropriate surface properties in order to allow for sufficient toner release at the seam.

Currently, seam adhesives consist of insulating ultraviolet-curable epoxies and hot-melt adhesives. Present seaming processes consist of the use of ultraviolet light to cure the epoxy adhesives or heat and pressure to thermally cure the hot melt adhesives or heat and pressure to thermally bond or "weld" the seam. While these adhesives and related processes produce seamed belts that exhibit acceptable strengths at room temperature under tensile load, most undergo premature failure at elevated temperatures. Additionally, belts made by existing seaming processes have been found to perform poorly under some important dynamic test conditions.

Therefore, it is desired to provide a process which produces a more robust seam for puzzle cut and other types of seamed belts. Further, it is desired to provide a process for producing a seam having electrical, mechanical and toner release characteristics that closely match those of the robust substrates. In addition, it is desirable to provide a process for producing a seam which is imagable, thereby reducing or eliminating the presence of print or copy defects. Also, it is desired to provide a process for producing a seam in which the height differential between the seam and the rest of the belt is virtually nil. Moreover, it is further desired to provide a process for producing a seam that is virtually or completely free of bubbles, voids and other inclusions, which may impact high quality image transfer or strength of the seam region. It is further desirable to provide a process that is easy to control and low cost.

U.S. Pat. No. 5,549,193 relates to an endless flexible seamed belt comprising puzzle cut members, wherein at least one receptacle has a substantial depth in a portion of the belt material at the belt ends.

U.S. Pat. No. 5,721,032 discloses a puzzle cut seamed belt having a strength-enhancing strip.

U.S. Pat. No. 5,487,707 discloses a puzzle cut seamed belt having a bond between adjacent surfaces, wherein an ultraviolet cured adhesive is used to bond the adjacent surfaces.

U.S. Pat. No. 5,514,436 relates to a puzzle cut seamed belt having a mechanically invisible seam, which is substantially equivalent in performance to a seamless belt.

U.S. Pat. No. 6,318,223 discloses a process and apparatus for producing an endless seamed flexible belt.

U.S. Pat. No. 6,316,070 discloses unsaturated carbonate adhesives for component seams.

U.S. Pat. No. 6,379,486 discloses process for seaming interlocking seams of polyimide component using polyimide adhesive.

U.S. Pat. No. 6,327,454 discloses imageable seamed belts having fluoropolymer adhesives between interlocking seaming members.

U.S. Pat. No. 6,387,465 discloses imageable seamed belts having fluoropolymer overcoat.

U.S. Pat. No. 6,527,105 discloses imageable seamed belts having hot melt processable, thermosetting resin and conductive filler adhesive between interlocking seaming members.

SUMMARY OF THE INVENTION

Embodiments of the present invention include: an endless seamed flexible belt comprising a first end and a second end which join to form a seam, the seam comprising an adhesive comprising a material selected from the group consisting of an oxidized charge transport molecule, a charge transport molecule, and mixtures thereof.

In addition, embodiments include: an endless seamed flexible belt comprising a first end and a second end, each of the first end and the second end comprising a plurality of mutually mating elements which join in an interlocking relationship to form a seam, the seam comprising an adhesive comprising a material selected from the group consisting of an oxidized charge transport molecule, a charge transport molecule, and mixtures thereof.

Moreover, embodiments include: an image forming apparatus for forming images on a recording medium comprising a charge-retentive surface to receive an electrostatic latent image thereon; a development component to apply toner to the charge-retentive surface to develop the electrostatic latent image to form a developed image on said charge retentive surface; a transfer belt to transfer the developed image from the charge retentive surface to a copy substrate, wherein the transfer belt is an endless seamed flexible belt comprising a first end and a second end which join to form a seam, the seam having an adhesive comprising a material selected from the group consisting of an oxidized charge transport molecule, a charge transport molecule and mixtures thereof; and a fixing component to fuse the developed image to the copy substrate.

BRIEF DESCRIPTION OF THE DRAWINGS

For a better understanding of the present invention, reference may be had to the accompanying figures.

DETAILED DESCRIPTION OF THE PRESENT INVENTION

The present invention relates to an endless flexible seamed belt having a seam, wherein the seam comprises an adhesive having a charge transport material. In embodiments, the adhesive comprises a charge transport molecule, an oxidized charge transport molecule, or mixtures thereof. In other embodiments, the adhesive comprises a charge transport molecule, an oxidized charge transport molecule, and a polymer binder. In another embodiment, the adhesive comprises an oxidized charge transport molecule and a charge transport polymer. In yet another embodiment, the adhesive comprises a photoacid, a charge transport molecule and a polymer binder. In still another embodiment, the adhesive comprises a photoacid, a charge transport molecule and an ultraviolet curable material. The adhesive provides a seam, in embodiments, which is imageable and wherein the occurrence of copy and print defects at the seam is reduced or eliminated. Image transfer is accomplished partly because the present seam possesses the desired conductivity and release properties required for sufficient transfer. The present invention further provides, in embodiments, a belt wherein the seam and belt material share electrical, mechanical and toner release characteristics. The present invention further provides, in embodiments, a belt having virtual uniform thickness at the seam. In addition, the adhesive allows for extended life of the belt.

In embodiments, the belt is an intermediate transfer belt, sheet, roller, or film useful in xerographic, including digital, apparatuses. However, the belts herein having a seam comprising a charge transport material can be useful as belts, rollers, drelts (a drum/belt hybrid), and the like, for many different processes and components such as photoreceptors, fusing members, transfix members, bias transfer members, bias charging members, developer members, image bearing members, conveyor members, cleaning members, and other members for contact electrostatic printing applications, xerographic applications, including digital, and the like. Further, the belts, herein, can be used for both liquid and dry powder xerographic architectures.

Figure 1:
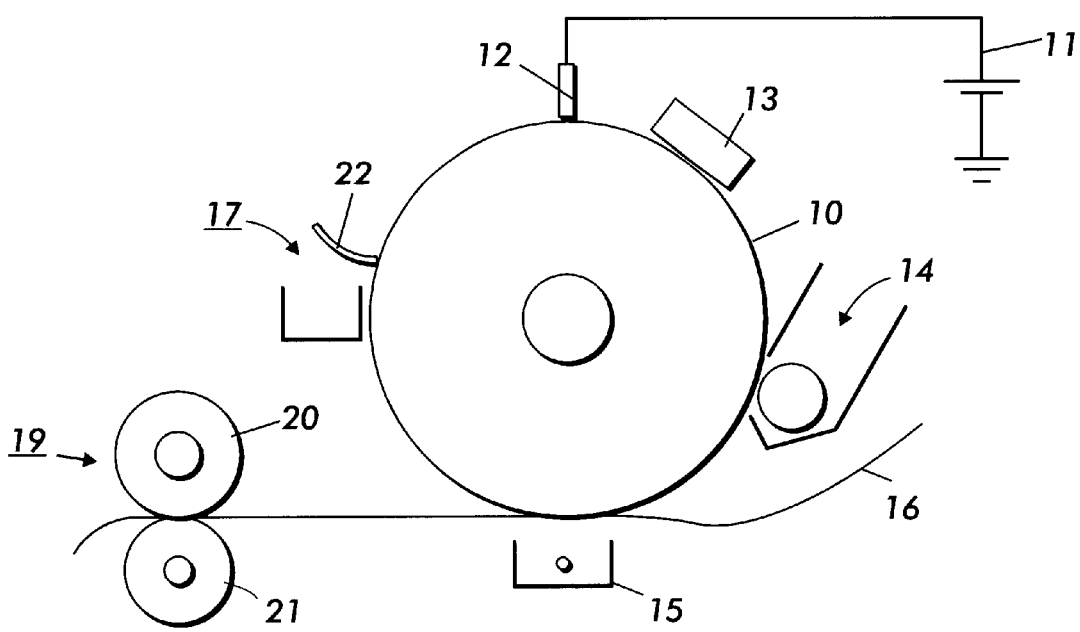
FIG. 1 is a depiction of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of an electrical charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. In embodiments the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
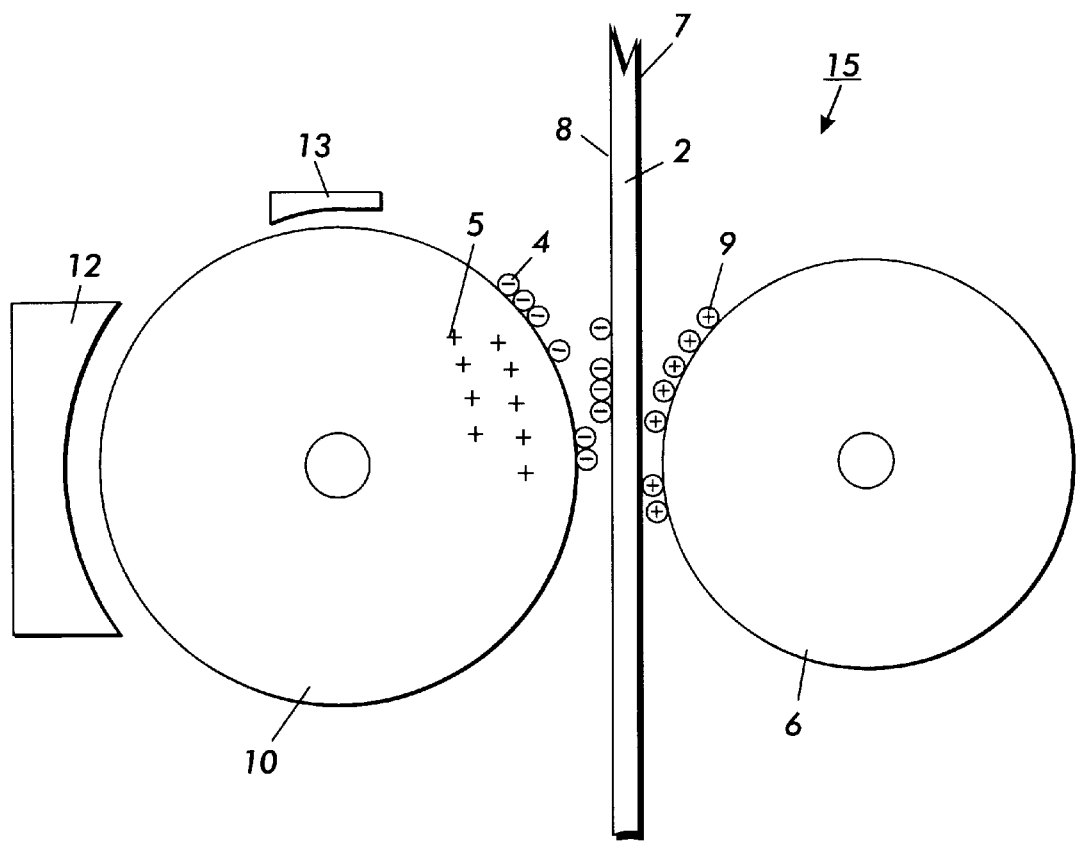
FIG. 2 is an enlargement of a transfer system according to an embodiment of the present invention.

FIG. 2 is a schematic view of an image development system containing an intermediate transfer member. FIG. 2 demonstrates another embodiment of the present invention and depicts a transfer apparatus 15 comprising a transfer member 2 positioned between an imaging member 10 and a transfer roller 6. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 2, each image being transferred is formed on the imaging drum by image forming station 12. Each of these images is then developed at developing station 13 and transferred to transfer member 2. Each of the images may be formed on the photoreceptor drum 10 and developed sequentially and then transferred to the transfer member 2. In an alternative method, each image may be formed on the photoreceptor drum 10, developed, and transferred in registration to the transfer member 2. In an embodiment of the invention, the multi-image system is a color copying system. In this color copying system, each color of an image being copied is formed on the photoreceptor drum. Each color image is developed and transferred to the transfer member 2. As above, each of the colored images may be formed on the drum 10 and developed sequentially and then transferred to the transfer member 2. In the alternative method, each color of an image may be formed on the photoreceptor drum 10, developed, and transferred in registration to the transfer member 2.

After latent image forming station 12 has formed the latent image on the photoreceptor drum 10 and the latent image of the photoreceptor has been developed at developing station 13, the charged toner particles 4 from the developing station 13 are attracted and held by the photoreceptor drum 10 because the photoreceptor drum 10 possesses a charge 5 opposite to that of the toner particles 4. In FIG. 2, the toner particles are shown as negatively charged and the photoreceptor drum 10 is shown as positively charged. These charges can be reversed, depending on the nature of the toner and the machinery being used. In an embodiment, the toner is present in a liquid developer. However, the present invention, in embodiments, is designed mostly for dry development systems.

A biased transfer roller 6 positioned opposite the photoreceptor drum 10 has a higher voltage than the surface of the photoreceptor drum 10. As shown in FIG. 2, biased transfer roller 6 contact charges the backside 7 of transfer member 2 with a positive charge. In an alternative embodiment of the invention, a corona or any other charging mechanism may be used to charge the backside 7 of the transfer member 2.

The negatively charged toner particles 4 are attracted to the front side 8 of the transfer member 2 by the positive charge 9 on the backside 7 of the transfer member 2.

Figure 3:
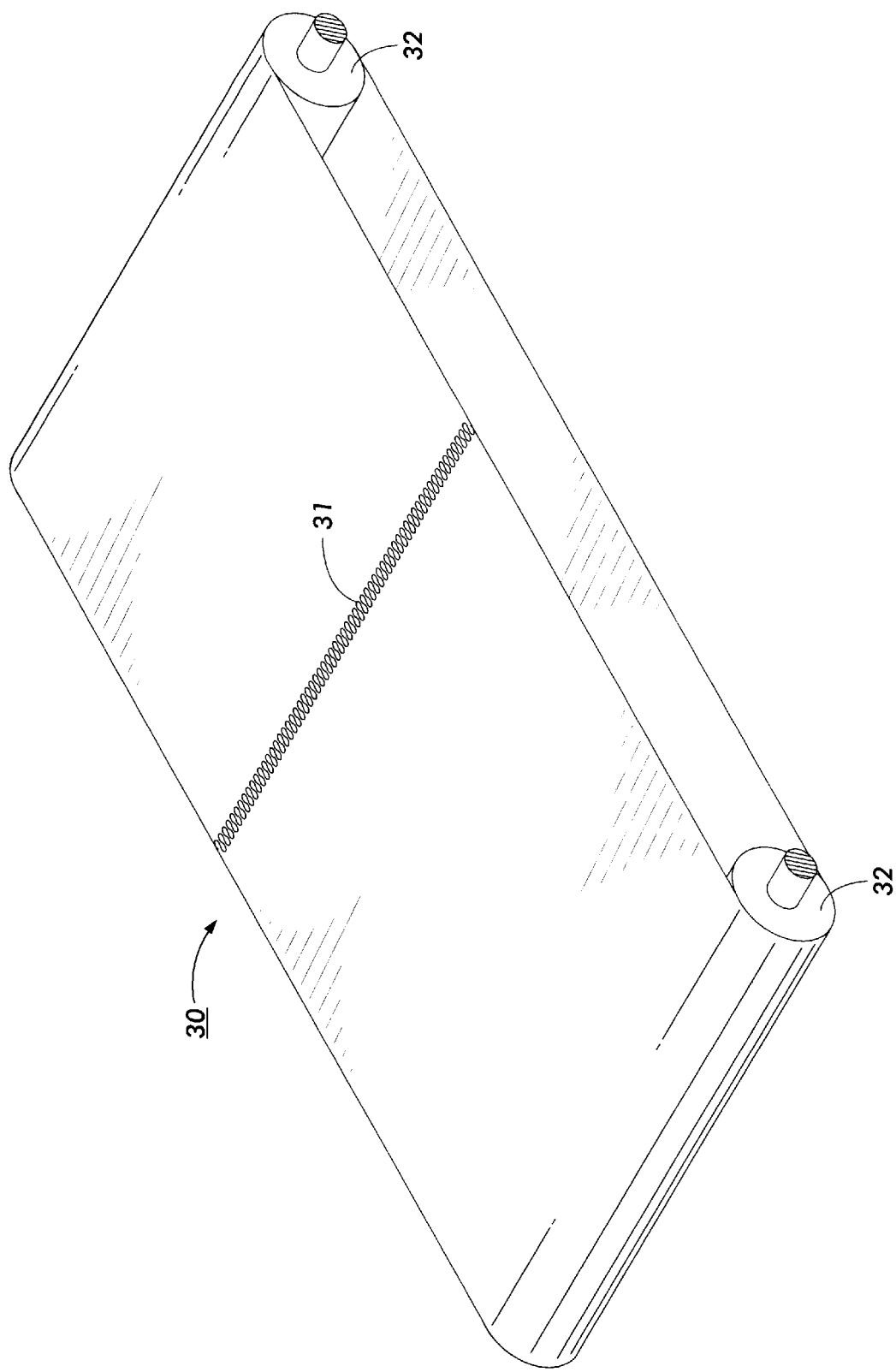
FIG. 3 is an enhanced view of an embodiment of a belt configuration and seam according to the present invention.

FIG. 3 demonstrates an example of an embodiment of a belt in accordance with the present invention. Belt 30 is demonstrated with seam 31. Seam 31 is pictured as an example of one embodiment of a puzzle cut seam. The belt is held in position and turned by use of rollers 32. Note that the mechanical interlocking relationship of the seam 31 is present in a two-dimensional plane when the belt 30 is on a flat surface, whether it be horizontal or vertical. While the seam is illustrated in FIG. 3 as being perpendicular to the two parallel sides of the belt, it should be understood that it may be angled or slanted with respect to the parallel sides. This enables any noise generated in the system to be distributed more uniformly and the forces placed on each mating element or node to be reduced.

The seam formed according to the present invention is one having a thin and smooth profile, of enhanced strength, improved flexibility and extended mechanical life. In an embodiment, the belt ends are held together by the geometric relationship between the ends of the belt material, which are fastened together by an interlocking arrangement. In an embodiment, the interlocking seaming members are in a puzzle cut formation. The puzzle cut seam can be of many different configurations, but is one in which the two ends of the seam interlock with one another in a manner of a puzzle. Specifically, the mutually mating elements comprise a first projection and a second receptacle geometrically oriented so that the second receptacle on the first end receives the first projection on the second end and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. In the present invention, the seam including the puzzle cut members, is held together by a resistive (controlled conductivity), hot-melt processable, thermosetting adhesive, which is compatible with the rest of the belt. The belt, in embodiments, provides improved seam quality and smoothness with substantially no thickness differential between the seam and the adjacent portions of the belt.

Figure 4:
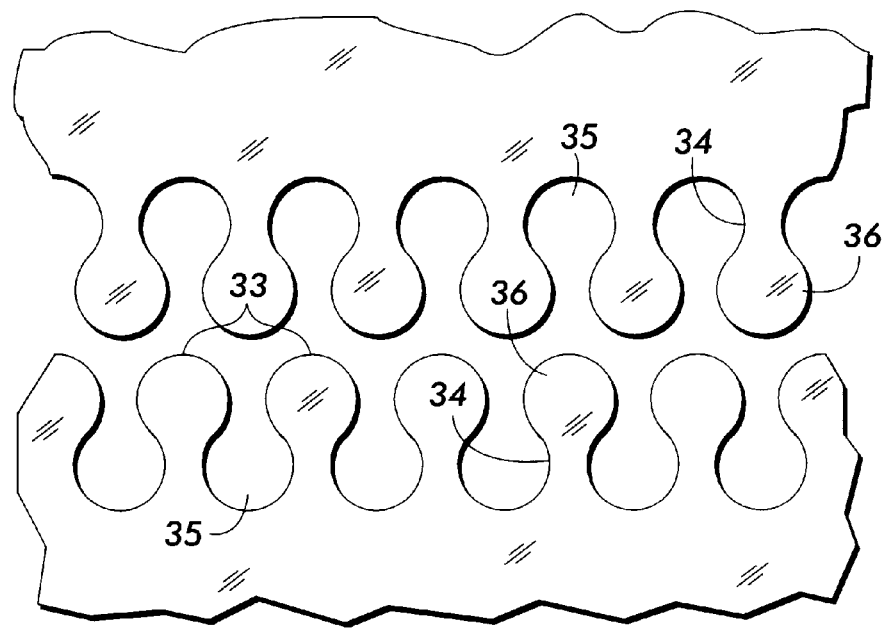
FIG. 4 is an enlargement of a puzzle cut seam having a head and neck member according to one embodiment of the present invention.
Figure 5:
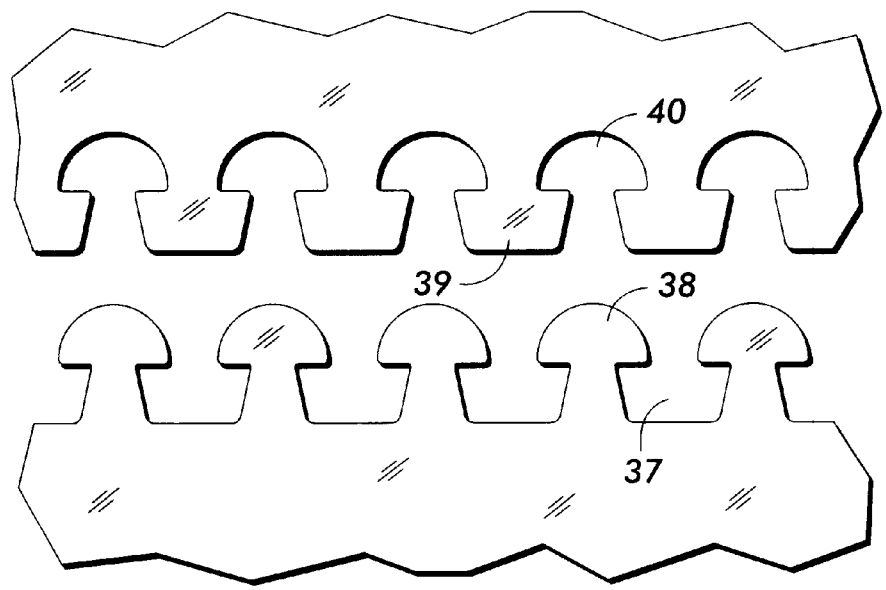
FIG. 5 is an enlargement of a puzzle cut seam having mushroom-shaped puzzle cut members according to another embodiment of the present invention.
Figure 6:
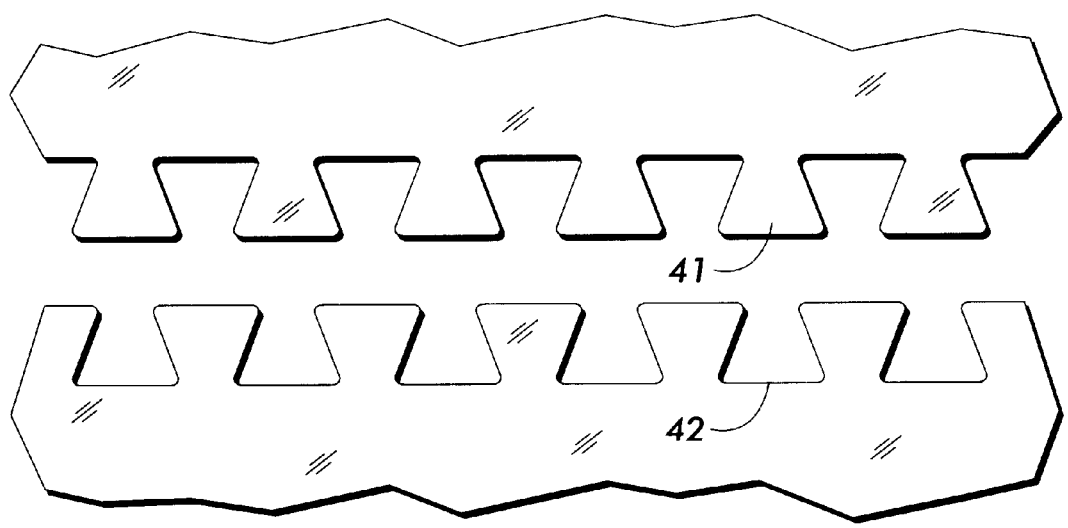
FIG. 6 is an enlargement of a puzzle cut seam having dovetail members according to another embodiment of the present invention.
Figure 7:
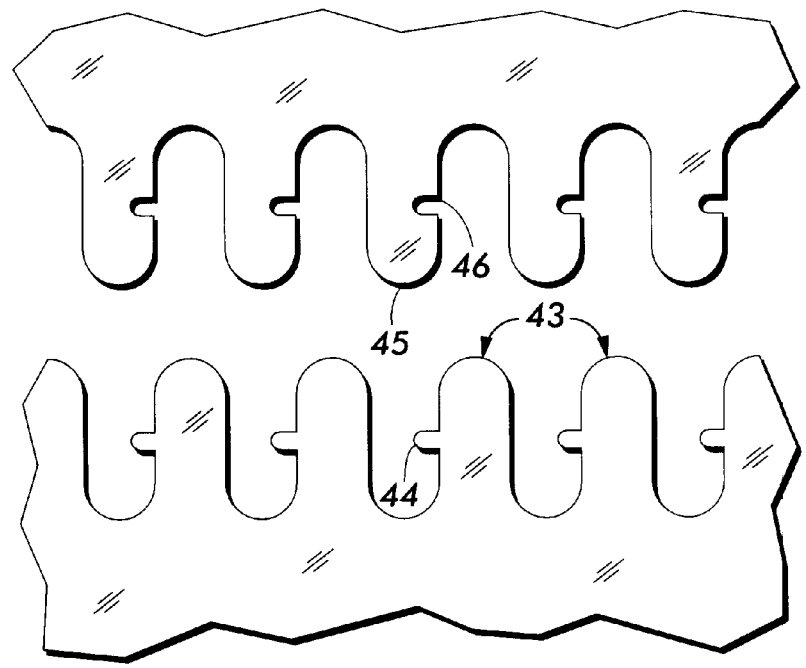
FIG. 7 is an enlargement of a puzzle cut seam having recessor and teeth members according to another embodiment of the present invention.

An example of an embodiment of a puzzle cut seam having two ends, each of the ends comprising puzzle cut members or mutually mating elements is shown in FIG. 4. The puzzle cut pattern may take virtually any form, including that of nodes such as identical post or neck 34 and head 33 or node patterns having projections 36 and receptacles 35 which interlock when brought together as illustrated in FIG. 4. The puzzle cut pattern may also be of a more mushroom-like shaped pattern having first projections 38 and 39 and second receptacles 40 and 37 as illustrated in FIG. 5, as well as a dovetail pattern as illustrated in FIG. 5 having first projections 41 and second receptacles 42. The puzzle cut pattern illustrated in FIG. 7 has a plurality of first fingers 43 with interlocking teeth 44 and plurality of second fingers 45 which have recesses 46 to interlock with the teeth 44 when assembled. In embodiments, the interlocking elements all have curved mating elements to reduce the stress concentration between the interlocking elements and permit them to separate when traveling around curved members such as the rolls 32 of FIG. 3. It has been found that with curved mating elements that the stress concentration is lower than with square corners where rather than the stress being uniformly distributed it is concentrated leading to possible failure.

Figure 8:
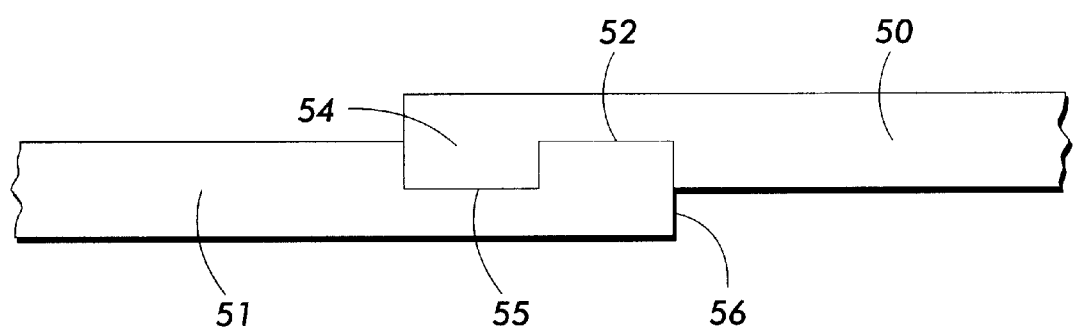
FIG. 8 is an enlargement of a puzzle cut seam having receptacle and projection members of differing depth according to another embodiment of the present invention.

Another example of a puzzle cut seam is shown in FIG. 8 in which the mutually mating elements or puzzle cut members comprise a first member 50 and a second member 51, wherein the first member 50 comprises a first receptacle 52 and a first projection 54, and the second member 51 comprises a second receptacle 55 and a second projection 56. The first receptacle 52 of the first member 50 receives the second projection 56 of the second member 51, and the second receptacle 55 of the second member 51 receives the first projection 54 of the first member 50. In order to reduce the height differential between the seamed portion and the adjacent, unseamed portion of the belt, it is desirable to have the second receptacles formed within their individual members at a substantial depth in a portion of the belt at the belt ends.

The height differential between the seam and the rest of the belt (the nonseamed portions of the belt) can be practically nil, or from about −25 to about +50 micrometers, or from about −5 to about +5 micrometers, or from about −1 to about +1 micrometers.

Figure 9:
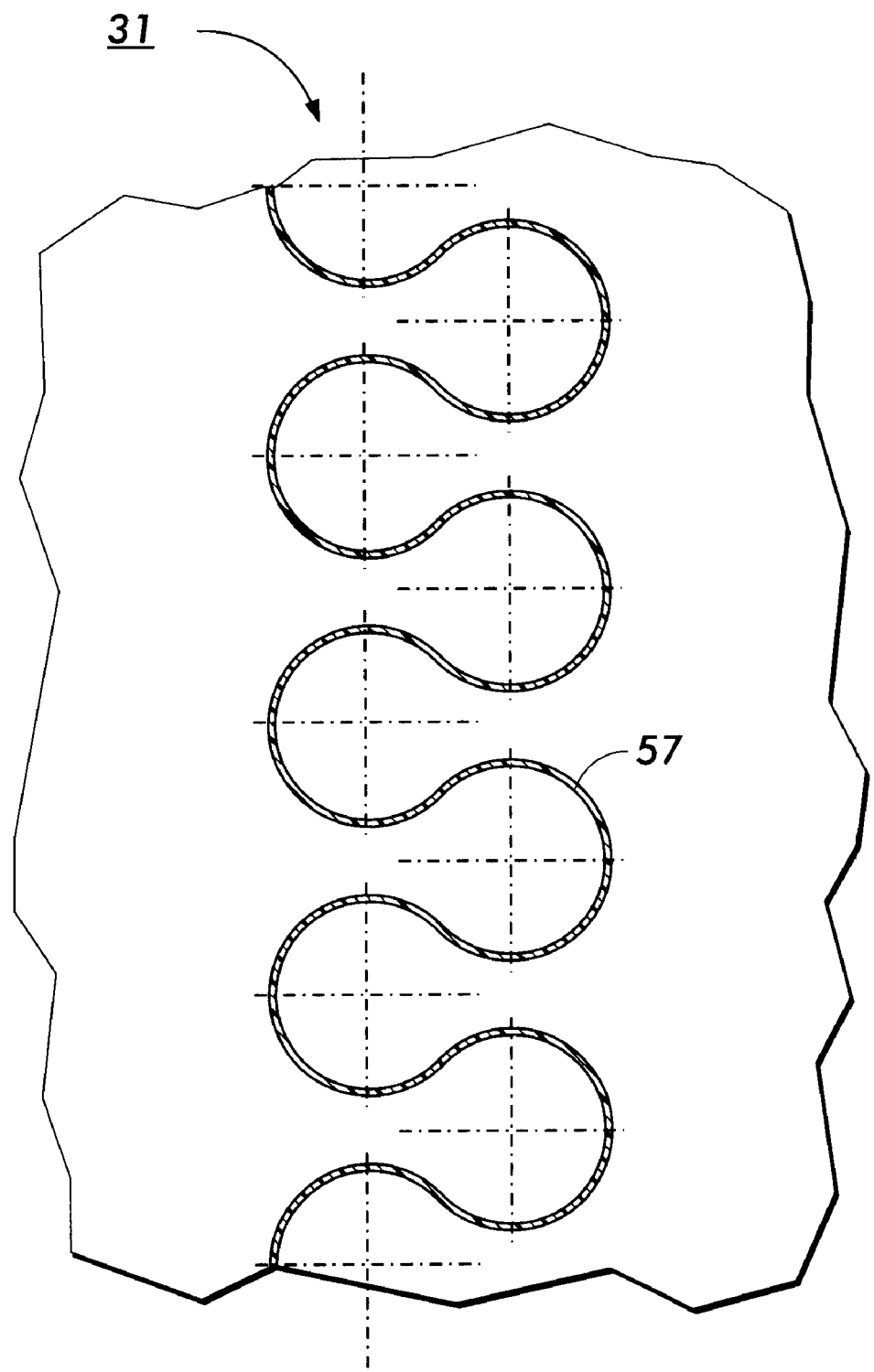
FIG. 9 is an enlarged version of a belt according to one embodiment of the present invention and demonstrates a crevice between the puzzle cut members, the crevice containing an adhesive.

A charge transport adhesive can be present between the seam, and placed in the crevice between the puzzle cut members to a thickness that fills the approximate 25 micrometer gap between the ends of the puzzle cut. As shown in one embodiment of a puzzle cut seam 31 according to the present invention, the adhesive is present between the puzzle cut members and at the seam crevice 57 of FIG. 9.

The adhesive is chosen to have a resistivity within the range desired for electrostatic transfer of toner. In embodiments, the resistivity of the seam is the same or similar to that of the belt in order to provide the same electrical properties for the seam and the rest of the belt. A volume resistivity for toner transfer performance is from about $10^4$ to about $10^{12}$ ohm-cm, or from about $10^6$ to about $10^{10}$ ohm-cm or, from about $10^6$ to about $10^8$ ohm-cm. This is the volume resistivity for the seam and the rest of the belt. In embodiments, the adhesive makes good electrical contact with the belt material. When the belt and the seam of the belt have a same or substantially the same electrical resistance, the toner transfer at the seam is the same or substantially the same as the transfer at the belt. Such transfer at the seam provides an invisible or substantially invisible seam.

In one embodiment, the adhesive for use with the seamed belt comprises a charge transporting molecule, an oxidized charge transporting molecule, or mixtures thereof. In an alternate embodiment, the adhesive comprises an oxidized transport molecule, a charge transport molecule and a polymer binder. In another embodiment, the adhesive comprises a photoacid, a charge transport molecule, and a polymer binder. In yet another embodiment, the adhesive comprises a charge transport molecule, a photoacid, and an ultraviolet material such as an ultraviolet monomer or oligomer. In yet a further embodiment, the adhesive comprises an oxidized charge transport molecule and a charge transport polymer.

A charge transport molecule is a molecule that contains free carriers of electricity, in the form of holes or electrons, or both, or is capable of accepting charge carriers from an extrinsic source and allows migration of carriers in the presence of an electric field. When incorporated into a polymer matrix, such molecule imparts the ability to support the migration of charge carriers (electrons or holes) throughout the polymer matrix. The charge carriers can be generated extrinsically and then injected into the polymer.

Alternatively, an oxidized charge transport molecule is a charge (hole) transport molecule that has been reacted with an oxidant, resulting in an electron transfer to the transport molecule, thus enhancing the semiconducting character. One could tune the conductivity of the material by adjusting the concentrations of the charge transport molecule and the oxidant.

Suitable oxidized charge transport compounds include oxidized arylamine salts comprising a cation of an arylamine and a counter anion, and oxidized oligo arylamine salts comprising the same. Examples of such arylamine salts and oligo arylamine salts include those having the formula TM—X or (TM)$_2$—Y, wherein TM is the cation of an arylamine charge transport molecule such as those listed above, and wherein X is a monovalent counter anion selected from the group consisting of $BF_4^-$, $PF_6^-$, $AsF_6^-$, $SbF_6^-$, $ClO_4^-$, $AuCl_4^-$, $C_{60}^-$, $I^-$, $Br_3^-$, $I_3^-$, $FeCl_4^-$, $SnCl_5^-$, $PO_3^-$, $(CF_3SO_3)_4Al^-$, $(CF_3SO_3)_4Ga^-$, $(CF_3SO_3)_4Ta^-$, $(CF_3SO_3)_4B^-$, trifluoroacetate, benzoate, nitrobenzoate, toluenesulfonate, p-bromobenzenesulfonate, p-nitrobenzenesulfonate, trifluoromethanesulfonate, nonafluorobutanesulfonate, 2,2,2-trifluoroethanesulfonate, tetraphenylborate, anionic tetracyanoquinodimethane, and bis(trifluoromethanesulfonyl)imide; and Y is a divalent counter anion selected from the group consisting of $SiF_6^{2-}$, $GeF_6^{2-}$, $TiF_6^{2-}$, $TaF_7^{2-}$, $NbF_7^{2-}$, $RuCl_6^{2-}$, $OsCl_6^{2-}$, $IrCl_6^{2-}$, $PdCl_4^{2-}$, $PdCl_6^{2-}$, $PdI_4^{2-}$, $PtCl_4^{2-}$, $PtCl_6^{2-}$, $PtBr_6^{2-}$, $IrCl_6^{2-}$, $ZrF_6^{2-}$, squarate, benzenedisulfonate, $B_{12}H_{12}^{2-}$, and $C_{60}^{2-}$.

In embodiments, the oxidized arylamine salt is of a formula selected from the group consisting of:

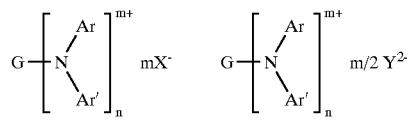

and mixtures thereof, wherein G is an aromatic group with from about 6 to about 24 carbon atoms and connects to all the diarylamine groups, Ar and Ar' are substituted or unsubstituted aromatic groups with from about 6 to about 18 carbon atoms, n is an integer of from about 2 to about 36, m is an integer which is less than or equal to n, $X^-$ is a monovalent counter anion selected from the group consisting of $BF_4^-$, $PF_6^-$, $AsF_6^-$, $SbF_6^-$, $ClO_4^-$, $AuCl_4^-$, $C_{60}^-$, $I^-$, $Br_3^-$, $I_3^-$, $FeCl_4^-$, $SnCl_5^-$, $PO_3^-$, $(CF_3SO_3)_4Al^-$, $(CF_3SO_3)_4Ga^-$, $(CF_3SO_3)_4Ta^-$, $(CF_3SO_3)_4B^-$, trifluoroacetate, benzoate, nitrobenzoate, toluenesulfonate, p-bromobenzenesulfonate, p-nitrobenzenesulfonate, trifluoromethanesulfonate, nonafluorobutanesulfonate, 2,2,2-trifluoroethanesulfonate, tetraphenylborate, anionic tetracyanoquinodimethane, and bis(trifluoromethanesulfonyl)imide; and $Y^{2-}$ is a divalent counter anion selected from the group consisting of $SiF_6^{2-}$, $GeF_6^{2-}$, $TiF_6^{2-}$, $TaF_7^{2-}$, $NbF_7^{2-}$, $RuCl_6^{2-}$, $OsCl_6^{2-}$, $IrCl_6^{2-}$, $PdCl_4^{2-}$, $PdCl_6^{2-}$, $PdI_4^{2-}$, $PtCl_4^{2-}$, $PtCl_6^{2-}$, $PtBr_6^{2-}$, $IrCl_6^{2-}$, $ZrF_6^{2-}$, benzenedisulfonate, squarate, $B_{12}H_{12}^{2-}$, and $C_{60}^{2-}$.

In an embodiment of the invention, the oxidized arylamine salt is selected from the group consisting of p-TPD—X and p-(TPD)$_2$—Y where X and Y are mono and divalent counter anions, respectively, and p-TPD is the cation of a para-substituted triarylamine compound with at least one of the para-substituted terminal segments selected from the partial formulas:

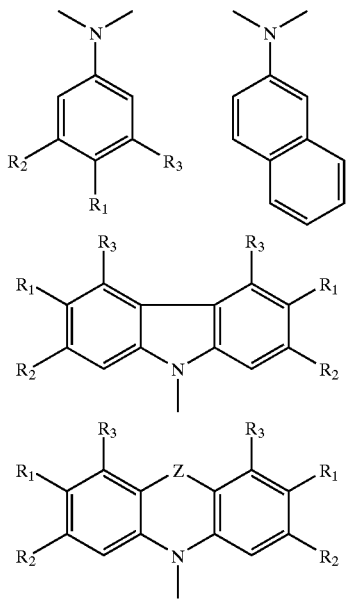

wherein $R_1$ is selected from the group consisting of bromine, chlorine, fluorine, alkyl groups with from about 1 to about 24 carbon atoms, such as methyl, ethyl, butyl, isobutyl, and the like, and alkoxy groups with from about 1 to about 24 carbon atoms, such as methoxy, ethoxy, butoxy, isobutoxy, and the like, $R_2$ and $R_3$ are independently selected from the group consisting of hydrogen, bromine, chlorine, fluorine, alkyl groups with from about 1 to about 24 carbon atoms, and alkoxy groups with from about 1 to about 24 carbon atoms, and Z is an atom of O, S, Se, or a methylene substituent —$CH_2$—.

In an embodiment, the oligo arylamine salt is of the following formula:

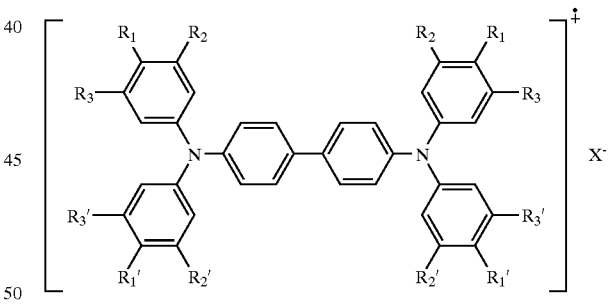

wherein $R_1$ and $R_1'$ are bromine, chlorine, fluorine, alkyl groups with from about 1 to about 24 carbons, alkoxy groups with from about 1 to about 12 carbons, or aromatic groups with carbon number of from about 6 to about 24; $R_2$, $R_3$, $R_2'$, and $R_3'$ are independently selected from the group consisting of hydrogen, bromine, chlorine, fluorine, alkyl groups containing from about 1 to about 24 carbon atoms, and alkoxy groups having a carbon number of from about 1 to about 12, wherein $X^-$ is a monovalent counter anion selected from the group consisting of $SbF_6^-$, $BF_4^-$, $PF_6^-$, $AsF_6^-$, $ClO_4^-$, $AuCl_4^-$, $C_{60}^-$, $I^-$, $Br_3^-$, $I_3^-$, $FeCl_4^-$, $SnCl_5^-$, trifluoroacetate, benzoate, nitrobenzoate, toluenesulfonate, p-bromobenzenesulfonate, p-nitrobenzenesulfonate, trifluoromethanesulfonate, nonafluorobutanesulfonate, and 2,2,2-trifluoroethane-sulfonate. In an embodiment, X— is selected from the group consisting of $SbF6^-$ and $AsF6^-$. The non-oligo arylamine salt is of the same formula as above, absent the brackets demonstrating the oligo nature of the molecule.

A specific example of an oxidized charge transport molecule is CAT® 196, available from Xerox Corporation (See U.S. Pat. No. 5,587,224, the subject matter of which is hereby incorporated by reference in its entirety.)

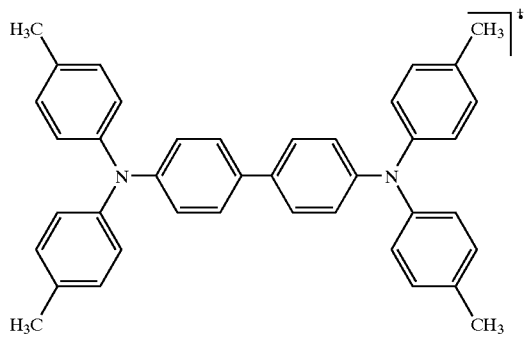

The oxidized charge transport molecule is present in the adhesive in an amount of from about 0.1 to about 2 percent by weight, or from about 0.5 to about 1 weight percent of total solids. Total solids as used herein refers to the total amount by weight of oxidized charge transport molecules, charge transport molecules, photoacids, polymer binders, ultraviolet curable materials, charge transport polymer and/or charge transport polymer binders, and other like solid materials.

The charge transporting molecules can be any known charge transporting molecules such as those described in U.S. Pat. Nos. 5,264,312; 4,338,222; 5,386,277; 5,448,342 and 5,587,224, the disclosures each of which are totally incorporated by reference herein in their entirety.

Examples of charge transport materials, either molecular doped into a polymer binder, or incorporated into polymeric structures, are para-substituted arylamine charge transport compounds.

The charge transport compound can be an arylamine of the following alternative formulas:

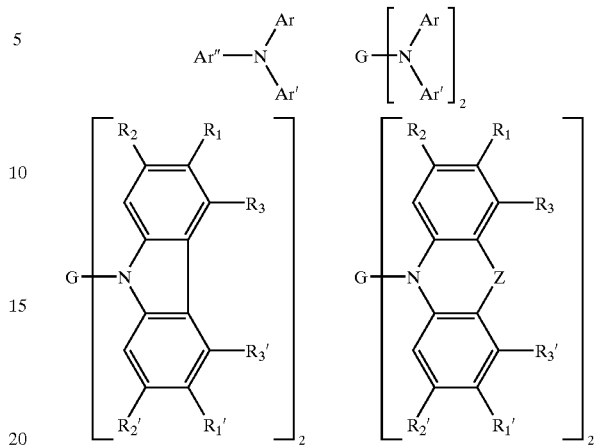

wherein Ar, Ar', and Ar" are independently selected from unsubstituted and substituted aromatic groups with from about 6 to about 30 carbon atoms, for example, phenyl, 3-methylphenyl, 4-methylphenyl, 3,4-dimethylphenyl, 4-ethylphenyl, 4-t-butylphenyl, 4-methoxyphenyl, 4-bromophenyl, 4-chlorophenyl, 3-iodophenyl, 4-fluorophenyl, 4-phenylphenyl, 2-naphthyl, 1-naphthyl, and the like, and mixtures thereof, and $R_1$, $R_2$, $R_3$, $R_1'$, $R_2'$, and $R_3'$ are independently selected from the group consisting of hydrogen, bromine, chlorine, fluorine, alkyl groups with from about 1 to about 24 carbon atoms such as methyl, ethyl, propyl, butyl, isobutyl, and the like, and alkoxy groups with from about 1 to about 24 carbon atoms such as methoxy, ethoxy, isobutoxy, and the like, Z is selected from the atoms O, S, Se, or a substituent —$CH_2$—, and G is an alkylene group with from about 1 to about 12 carbon atoms or a group selected from the partial formulas:

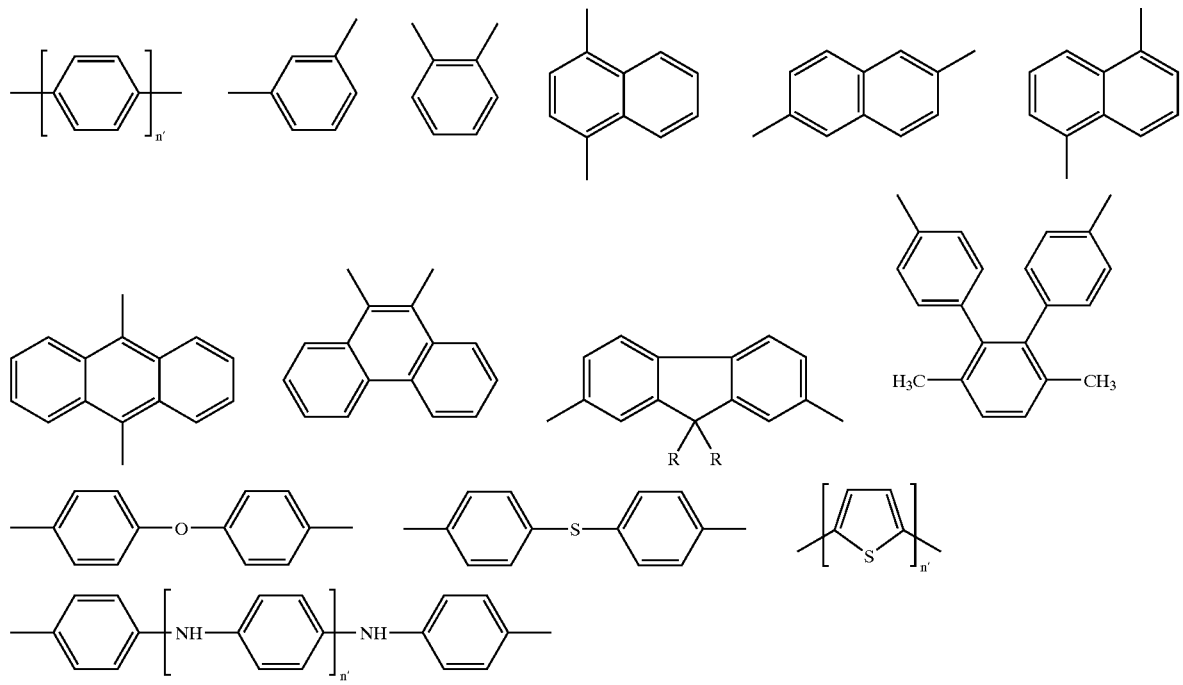

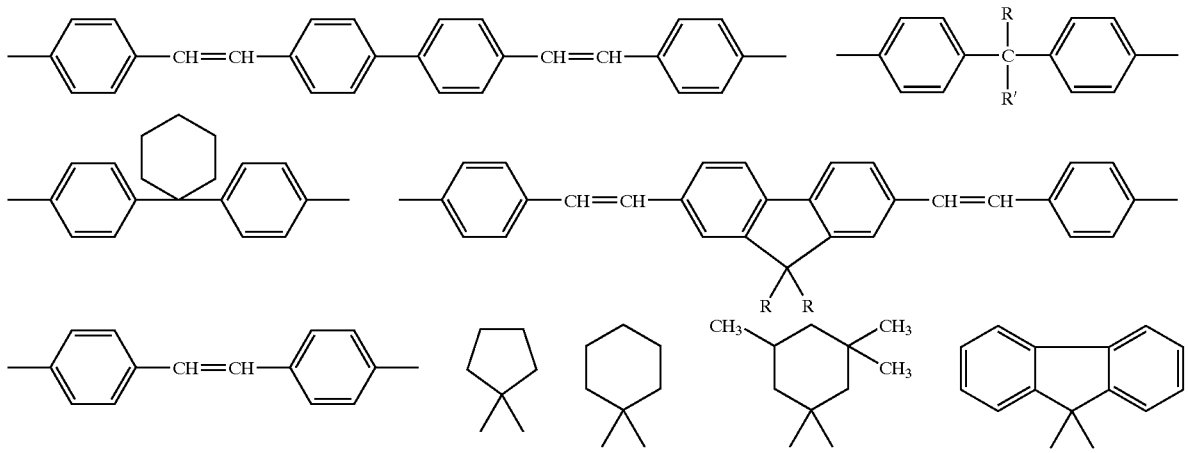

wherein n' is an integer of from about 1 to about 12, and R and R' are alkyl groups with, for example, from about 1 to about 12 carbon atoms such as methyl, ethyl, propyl and the like.

The charge transport compound can include the following arylamine compounds and mixtures thereof:

a) aryidiamine compounds of the formula:

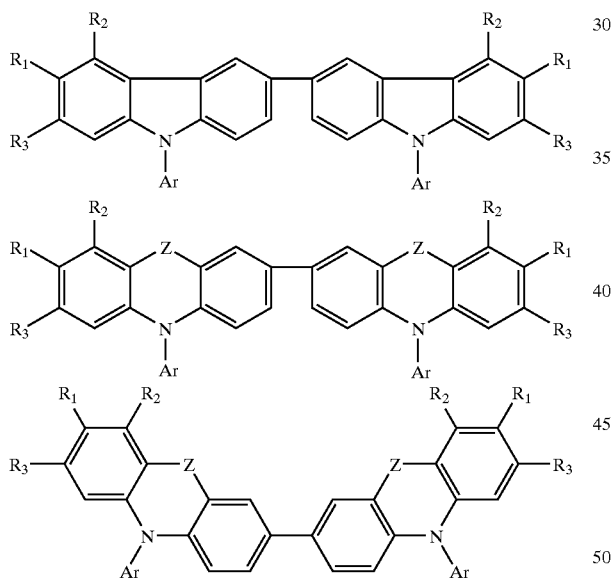

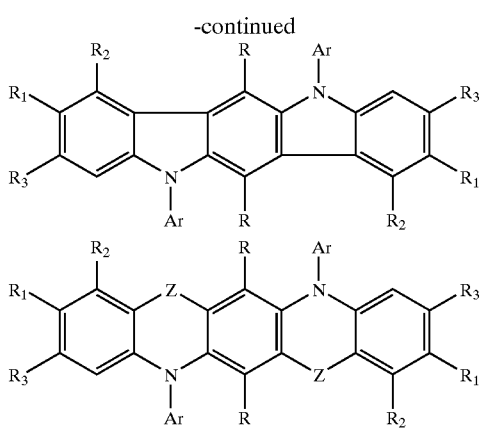

wherein Ar is a substituted or unsubstituted aromatic group, for example, phenyl, 3-methylphenyl, 4-methylphenyl, 3,4-dimethylphenyl, 4-ethylphenyl, 4-t-butylphenyl, 4-methoxyphenyl, 4-bromophenyl, 4-chlorophenyl, 3-iodophenyl, 4-fluorophenyl, 4-phenylphenyl, 2-naphthyl, 1-naphthyl, and the like, and mixtures thereof, $R_1$, $R_2$ and $R_3$ are independently selected from the group consisting of hydrogen, bromine, chlorine, fluorine, alkyl groups with from about 1 to about 24 carbon atoms, and alkoxy groups with from about 1 to about 24 carbon atoms, and Z is selected from an atom O, S, Se, or a methylene substituent —$CH_2$—;

b) aryltriamines compounds of the formula:

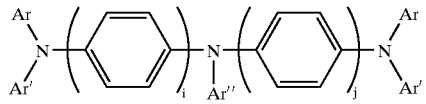

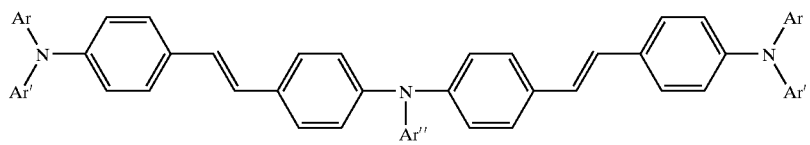

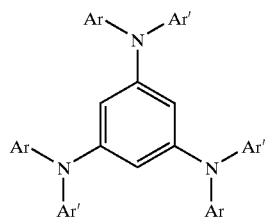

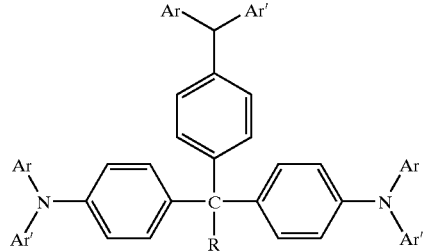
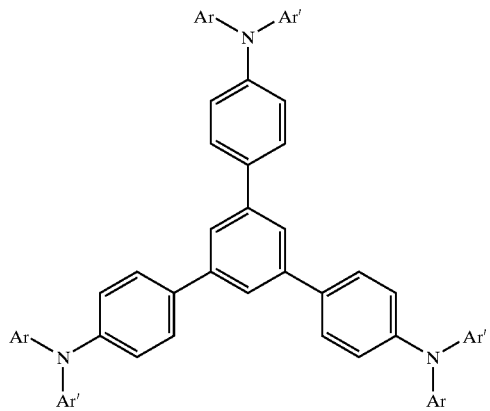
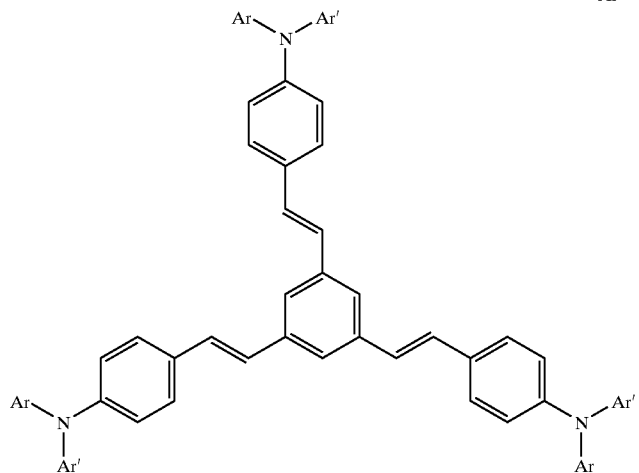
wherein Ar and Ar' are independently selected from substituted and unsubstituted aromatic groups, R is selected from hydrogen, phenyl containing from about 6 to about 20 carbon atoms and alkyl groups containing from about 1 to about 12 carbon atoms, and wherein i and j are integers of from about 1 to about 2;
c) aryltetraamines compounds of the formula:
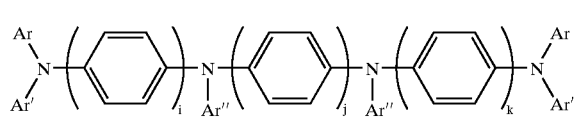
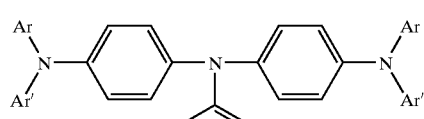
-continued
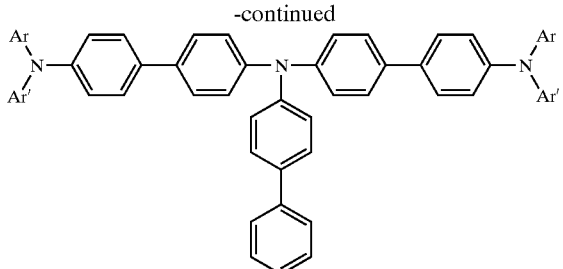
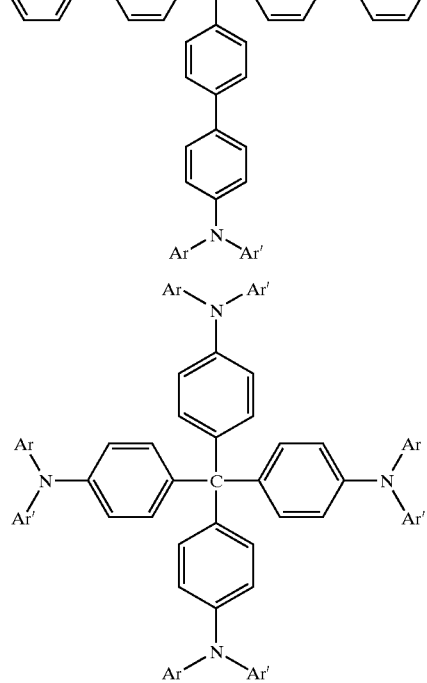

-continued

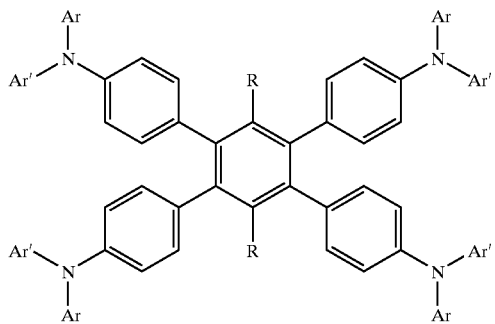

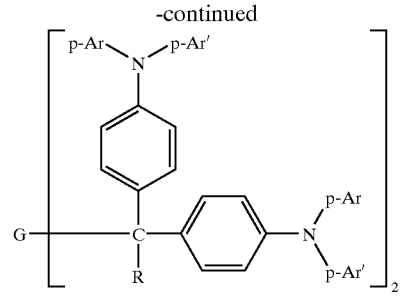

wherein Ar, Ar', and Ar" are independently selected from substituted and unsubstituted aromatic groups with from about 6 to about 20 carbon atoms, p-Ar and p-Ar' are independently selected from para-substituted aromatic groups with from about 6 to about 20 carbon atoms, R is selected from hydrogen, phenyl with from about 6 to about 20 carbon atoms and alkyl groups containing from about 1 to about 12 carbon atoms, i, j, and k are integers 1 or 2, G is an alkylene group with from about 1 to about 12 carbon atoms such as methylene, ethylene, propylene, butene and the like, or a group selected from the partial formulas:

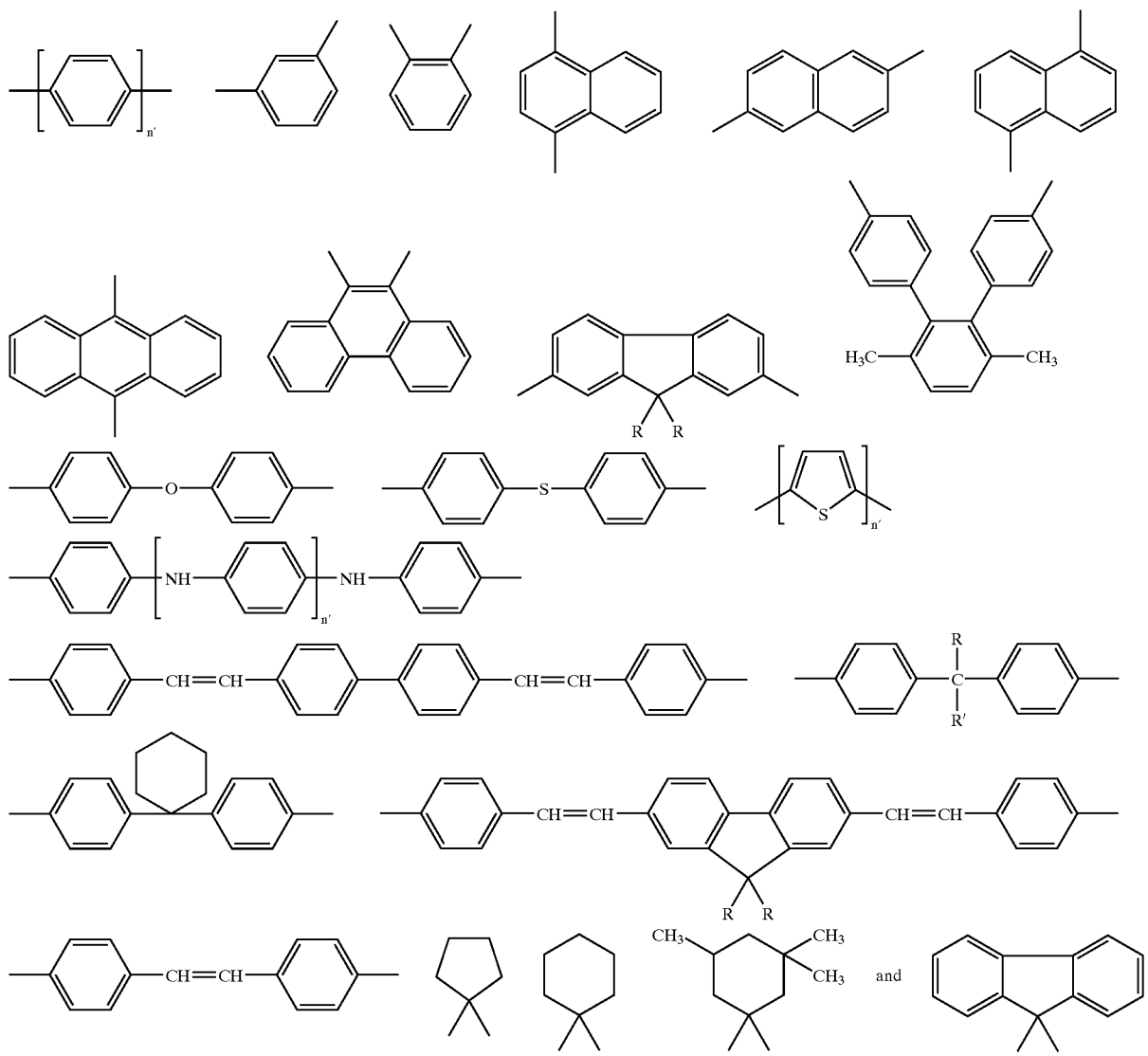

wherein n' is an integer from about 1 to about 12, and R and R' are alkyl groups with from about 1 to about 12 carbon atoms;

d) arylpentaamines compounds of the formula:

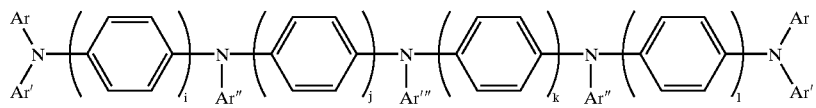

wherein Ar, Ar', Ar'', and A''' are independently selected from substituted and unsubstituted aromatic groups with from about 6 to about 20 carbon atoms, and i, j, k, and l are integers of 1 or 2; and e) arylhexaamines compounds of the formula:

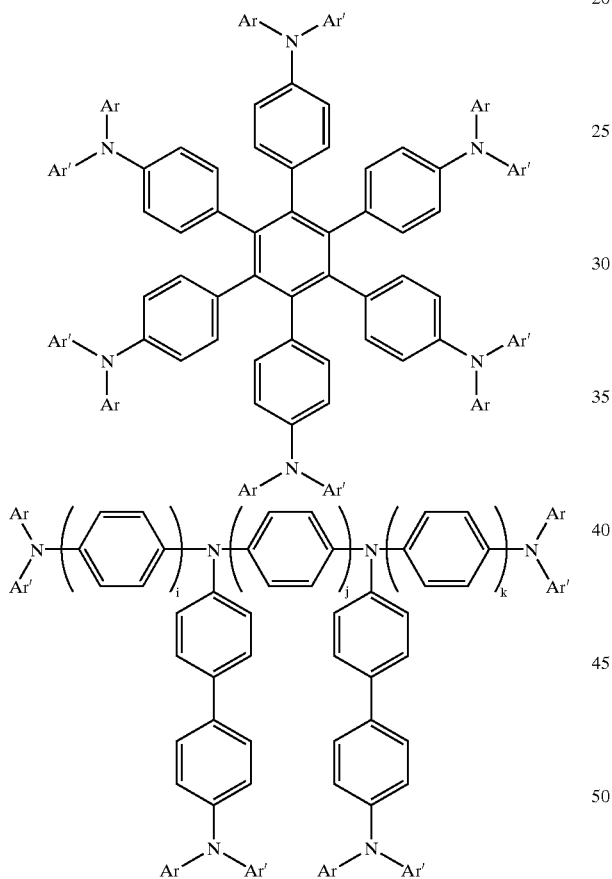

-continued

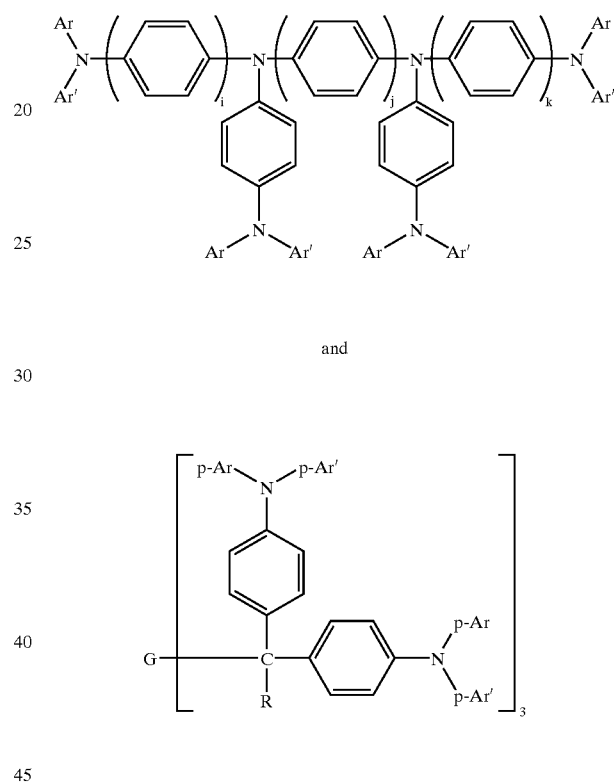

and wherein Ar and Ar' are independently selected from substituted and unsubstituted aromatic groups with from about 6 to about 20 carbon atoms, p-Ar and p-Ar' are para-substituted aromatic groups with from about 6 to about 20 carbon atoms, i, j, and k are integers of 1 or 2, G is a alkylene group with from about 1 to about 12 carbon atoms or an aromatic group selected from the formulas:

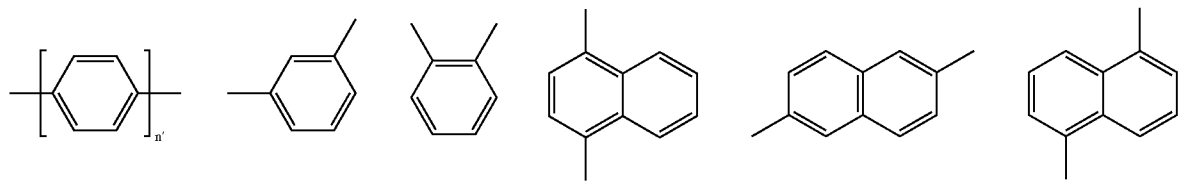

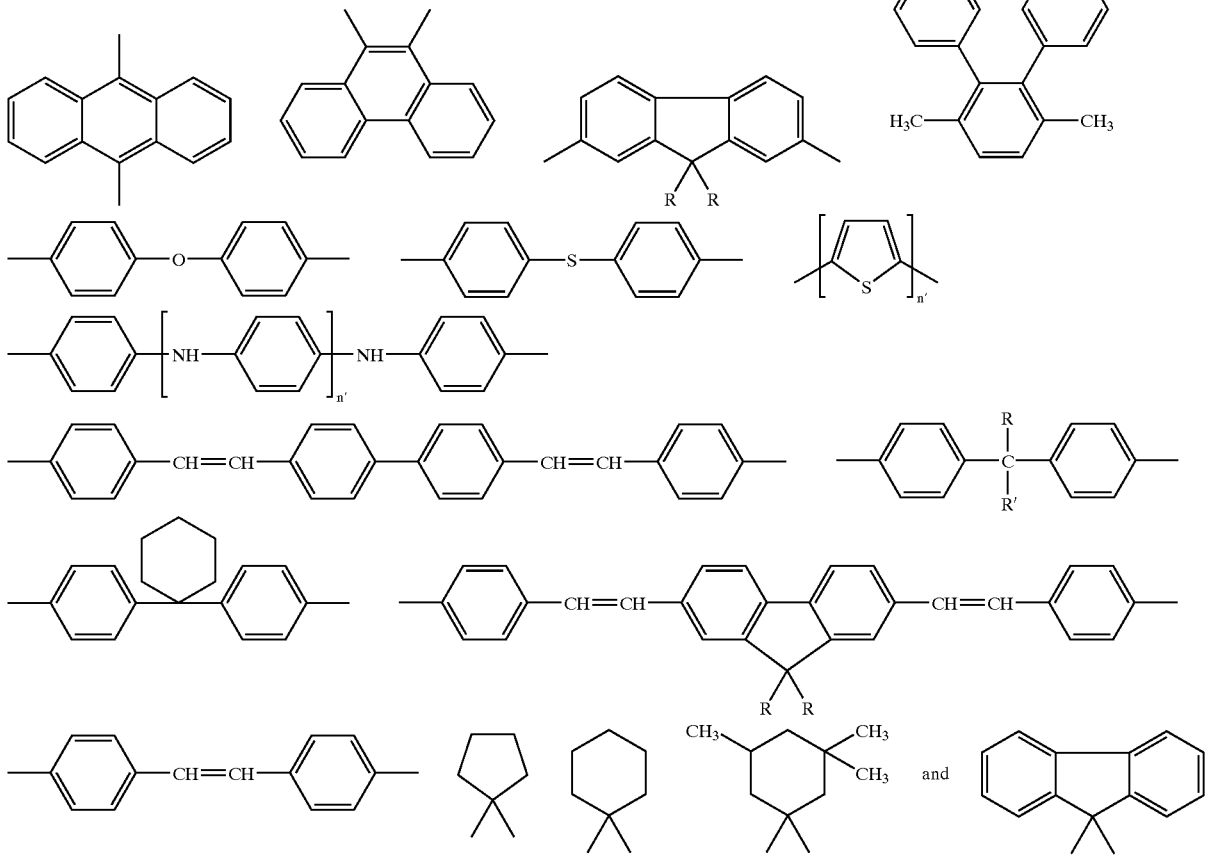

wherein n' is an integer from about 1 to about 12, and R and R' are alkyl groups with from about 1 to about 12 carbon atoms.

The arylamine charge transport compound can be para-substituted triarylamine compounds with at least one of the para-substituted molecular segments selected from the partial formulas:

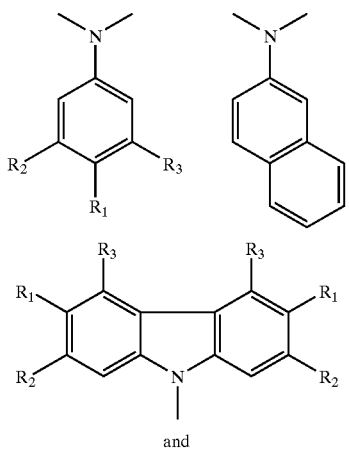

and

-continued

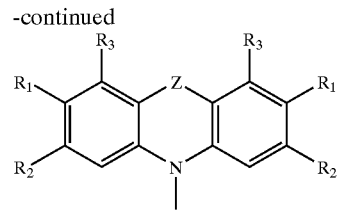

wherein $R_1$ is selected from the group consisting of bromine, chlorine, fluorine, alkyl groups with from about 1 to about 24 carbon atoms, and alkoxy groups with from about 1 to about 24 carbon atoms, $R_2$ and $R_3$ are independently selected from the group consisting of hydrogen, bromine, chlorine, fluorine, alkyl groups with from about 1 to about 24 carbon atoms, and alkoxy groups with from about 1 to about 24 carbon atoms, and Z is an atom of O, S, Se, or a methylene substituent —$CH_2$—.

Specific examples of charge transport molecules include N,N'-diphenyl-N,N'-bis(m-methylphenyl)-(1,1'-biphenyl)-4,4'-diamine (TPD or m-TBD) and N,N,N',N'-tetra-p-tolyl-1,1'-biphenyl-4,4'-diamine (TM—TPD). A suitable charge transport molecule includes a meta-substituted dimethyl TPD such as that having the formula:

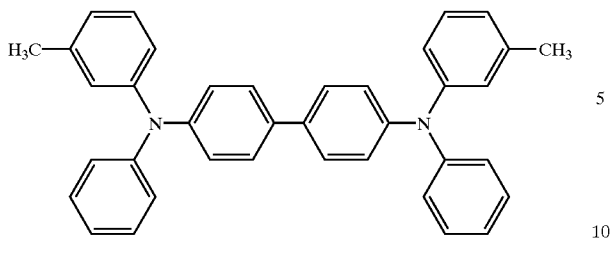

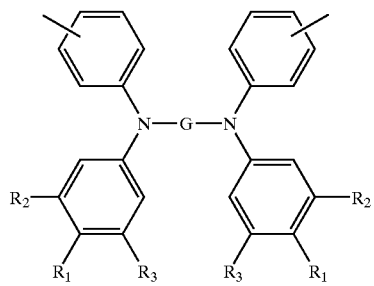

wherein the oxidized form of the substituted arylamine charge transport compound results from photo-oxidation with photo-oxidants such as diphenyliodonium salts and diarylsulfonium salts.

The charge transport molecule is present in the adhesive in an amount of from about 1 to about 70 percent by weight, or from about 20 to about 40 percent by weight of total solids.

A charge transport polymer, in embodiments, is selected from polymers that contain a para-substituted aryldiamine unit of the formula:

wherein $R_1$ is selected from the group consisting of bromine, chlorine, fluorine, alkyl groups containing from about 1 to about 24 carbon atoms, and alkoxy groups containing from about 1 to about 24 carbon atoms, $R_2$ and $R_3$ are independently selected from the group consisting of hydrogen, bromine, chlorine, fluorine, alkyl groups containing from about 1 to about 24 carbon atoms, such as methyl, ethyl, butyl, isobutyl, cyclohexyl, and the like, and alkoxy groups containing from about 1 to about 24 carbon atoms, G is selected from the group consisting of alkaline groups of from about 1 to about 12 carbon atoms and of the formulas:

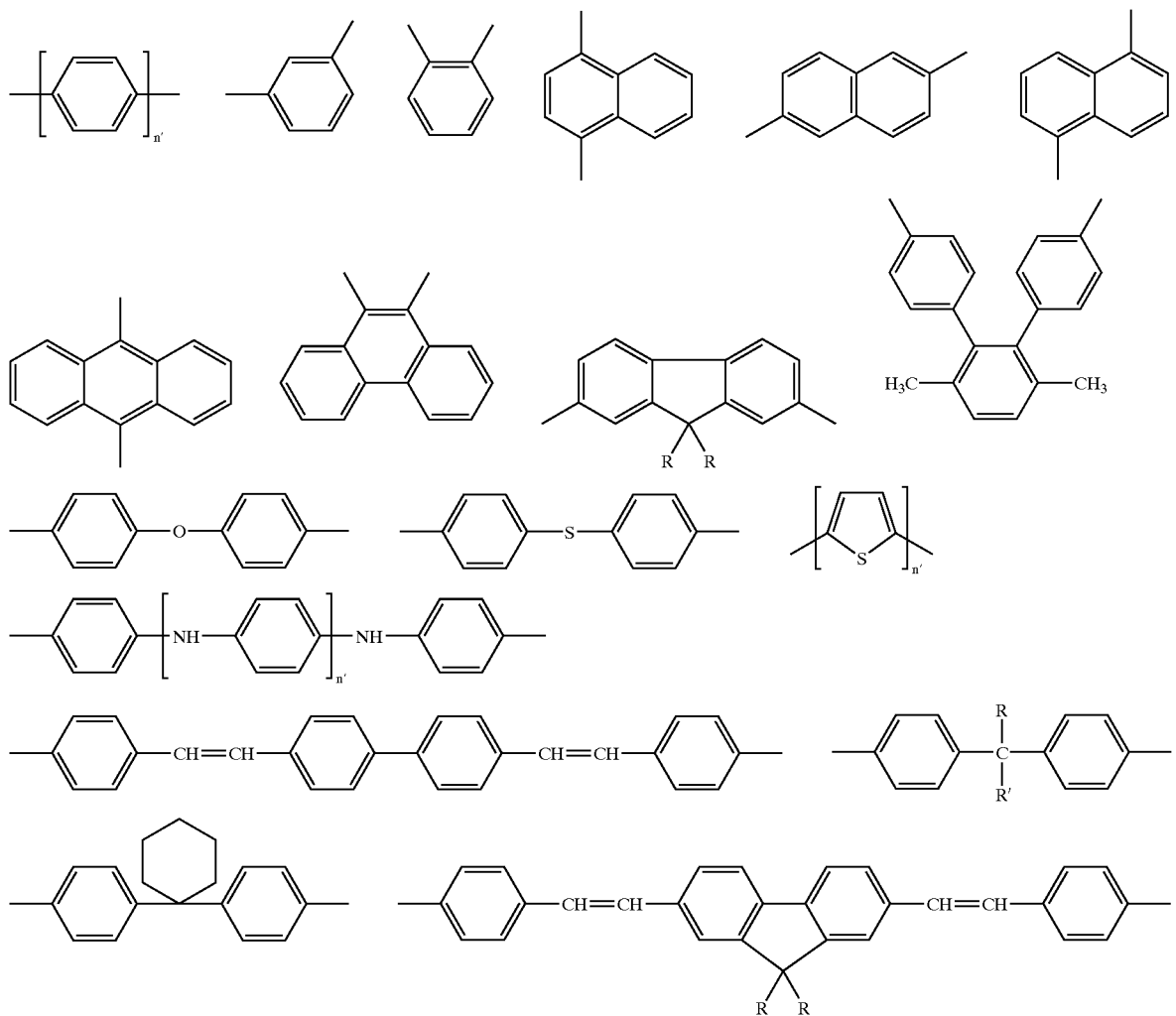

-continued

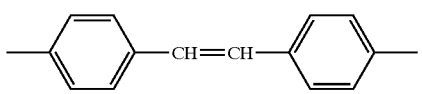  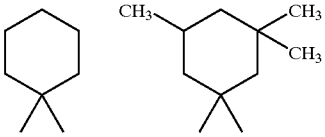 and 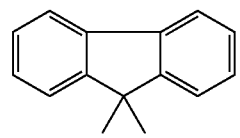

wherein n' is an integer of from about 1 to about 12, and R and R' are alkyl groups with from about 1 to about 12 carbon atoms. Other examples of charge transport polymers include PEC (polyether carbonate), polyvinylcarbazole, triarylamine doped polycarbonate, triphenylamine-containing poly(N-methylacrylimide and polysilanes.

The charge transport polymer is present in the adhesive in an amount of from about 1 to about 70, or from about 20 to about 40 percent by weight of total solids.

Polymer binder, as used herein, is an insulative dielectric polymer resin that serves as a matrix for the charge transport molecule. The polymer binder, in embodiments, includes thermoplastics such as polystyrenes, polycarbonates, polysiloxanes, polyesters, polyimides, polyurethanes, polysulfones, polyethersulfones, polyether ketones, polyamides, thermoplastic elastomers, and mixtures thereof. An example of a commercially available polymer binder is the polyimide ULTEM® from General Electric, Schenactady, N.Y.

The polymer binder is present in the adhesive in an amount of from about 40 to about 95 percent by weight, or from about 60 to about 75 percent by weight of total solids.

A photoacid, as used herein, is an compound, which is otherwise dormant, but becomes oxidative when activated by light (photo-oxidation). Examples of photoacids include anionic salts of the formula AX, wherein A is a cation ion selected, for example, from the group consisting of diaryliodosonium, triarylsulfoxonium, pyrylium, thiapyrilium, phenlylacyldialkylsofonium, phenylacyldiakylamonium, quinolinium, phenylacyltritriphenylphosphonium, ferrocinium, coboltocinium, and wherein X is an anion selected, for example, from the group consisting of chloride, bromide, iodide, hexafluoroantimonate, hexafluoroarsenate hexafluorophosphate, tetrafluoroborate, trifluoroacetate, triflate, toluenesulfonate, nitrobenzenesulfonate, camphorsulfonate, and dodecylsulfonate. A specific example of a photoacid is di(p-t-butylphenyl) iodonium hexafluoroarsenate. Alternatively, the photoacid can be nonionic, latent organic acid generating compounds, for example, α-sulfonyloxyketones, 2,6-dinitrobenzyl mesylate, 2,6-dinitrobenzyl pentafluorobenzenesulfonate, nitrobenzyltriphenylsilylether, phenyl najphthoquininediazide-4-sulfonate, 2-phenyl-4,6-bis-trichloromethyl-s-triazine and mixtures thereof. (See J. V. Crivello & K. Dietliker in "Chemistry and Technology of UV and EB Formulation for Coatings, inks and Paints", P. K. Olsring ED., Selective Industrial Training Associates Ltd., London, UK, 1991, Chapter 3).

The photoacid is present in the adhesive in amounts of from about 1 to about 50 percent by weight of the charge transport molecule, or from 2 to about 15 percent by weight of the charge transport molecule. However, the desired concentration depends on the resistivity of the belt substrate material.

UV curable materials are materials that are capable of undergoing light-induced chain reactions (usually in the presence of a photoinitiator), activated by the absorption radiation in the ultraviolet range of the electromagnetic spectrum. The ultraviolet curable material includes ultraviolet curable monomers, polymers, oligomers, and mixtures thereof. Examples of suitable ultraviolet curable materials include acrylates, methacrylates, epoxies, vinyl monomers, epoxy acrylates, urethane acrylates, polyether urethane acrylates, polyester acrylates, polyether acrylates, acrylated oils, thiols, and the like, and mixtures thereof.

The ultraviolet curable material is present in the adhesive in amounts of from about 50 to about 100 percent, or from about 90 to about 98 percent by weight of total solids.

One procedure for preparing a UV curable adhesive formulation comprises dissolving the charge transport molecule, binder and the oxidized charge transport molecule in a suitable solvent, followed by addition of the photoacid and, stirring to assure a uniformed distribution. The adhesive can then be applied to the seam by any suitable means including liquid means such as using a cotton-tipped applicator, liquid dispenser, glue gun or the like, or by dry processes such as by using a dry tape. The solvents can be, for example, toluene, tetrahydrofuran, or alkylene halides such as methylene chloride, chlorobenzene, and mixtures thereof. Photoactivation can be achieved by irradiation in ambient light, filtered light, electron beam, ultraviolet light, visible light, and the like, depending on the photosensitivity of the photoacid selected and the desired conductivity of the resulting adhesive. For example, suitable irradiation wavelengths reside in the range of about 220 to 750 nanometers. Irradiation can be for periods of about 5 seconds to 24 hours, and radiation temperature resulting from radiant energy or ambient conditions can be from about 20 to 150° C.

The adhesive in solution may be applied at the seam and between interlocking seaming members, by any suitable means including liquid means such as using a cotton-tipped applicator, liquid dispenser, glue gun or the like, or by dry processes such as by using a dry tape. An amount in slight excess of the amount of adhesive sufficient to fill the seam when dry is added between interlocking seaming members.

The thermally curable adhesive can be prepared by known methods, or by compounding the material ingredients together with the appropriate solvents to form the film solution. The adhesive film composite, with or without a removable release backing, is then applied to align with only the puzzle-interlocked seamed region of the belt or film member. The seam is then pressed between parallel heated plates, for example the jaws of a Vertrod seam welder. The seam can then be cured by various methods. Curing procedures useful in curing the seam include thermal curing and infrared curing. Examples of heat curing include use of moderate to high heat once the adhesive is placed in the seam crevice. This heating also induces the crosslinking/solidification reaction and increases the seam processing and belt fabrication speed. Desired temperature includes from about 40 to about 250° C., or from about 100 to about 150° C., at a time of from about 30 seconds to about 24 hours, or from about 5 minutes to about 2 hours, or from about 5 minutes to about 15 minutes. The pressure during the heat curing is from about 0.5 psi to about 100 psi, or from about 2 psi to about 60 psi. Increased pressure enables welding at lower temperatures and vise versa. Heat may be applied by, for example, a welder, heat gun, oven, or other suitable means.

In some cases, a second post-cure is carried out in order to sufficiently crosslink the lower molecular weight oligomers into a higher molecular weight polymeric network. The second post cure occurs at a higher temperature than the first cure. The temperature of the second cure is from about 120 to 200° C. at a time of from about 30 seconds to about 24 hours, or 20 minutes to about 1 hour, and at a pressure of from about 0.5 psi to about 100 psi, or from about 2 psi to about 10 psi.

The substrate must be robust to undergo multiple cycling through rigorous use. Examples of suitable substrate materials include semiconductive polyimides such as polyanaline polyimide, carbon filled polyimides, carbon filled polycarbonate, carbon filled polyesters, and the like. Examples of commercially available polyimide substrates include KAPTON® and UPLIEX® both from DuPont, and ULTEM from GE. Example of commercially available polyesters include Mylar® from DuPont, and the like.

The substrate may include a filler. The filler, if present in the substrate, is present in an amount of from about 1 to about 60, or from about 3 to about 40 percent by weight of total solids. Examples of suitable fillers for use in the substrate include carbon fillers, metal oxide fillers, doped metal oxide fillers, other metal fillers, polymer fillers, other conductive fillers, and the like. Specific examples of fillers include carbon fillers such as carbon black, fluorinated carbon black, graphite, low conductive carbon, and the like, and mixtures thereof; metal oxides such as indium tin oxide, zinc oxide, iron oxide, aluminum oxide, copper oxide, lead oxide, and the like, and mixtures thereof; doped metal oxides such as antimony-doped tin oxide, antimony-doped titanium dioxide, aluminum-doped zinc oxide, similar doped metal oxides, and mixtures thereof; and polymer particles such as polytetrafluoroethylene, polypyrrole, polyaniline, doped polyaniline, polythiophene and the like, and mixtures thereof. Suitable fillers include carbon black, antimony doped tin oxide, doped polyanaline, and mixtures thereof.

In an optional embodiment of the invention, an overcoat is coated on the substrate following seaming with the charge transport adhesive. Suitable overcoats include fluoropolymers, silicones, vinyl butyral composites, the charge transport compositions described herein, and the like overcoats.

In the embodiment wherein a coating is applied to the substrate following seaming, a filler can be added to the coating. Examples of suitable fillers include the fillers listed above as suitable for use in the adhesive and include carbon fillers, metal oxide fillers, doped metal oxide fillers, other conductive filers, and the like. Other fillers may be used, such as fillers having a purpose of altering the surface and mechanical properties. These include polytetrafluoroethylene powder, and the like. A specific example of a filler is fluorinated carbon such as CARBOFLUOR® or ACCUFLUOR®, available from Advance Research Chemicals, Caroosa, Okla.

Figure 10:
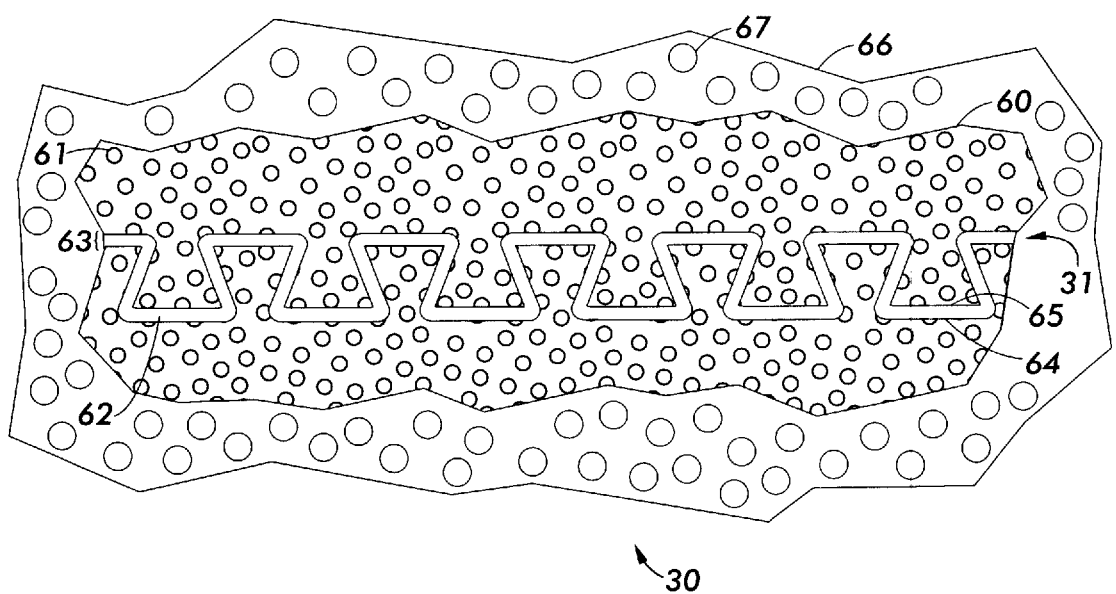
FIG. 10 is an enlarged cross-sectional view of a belt according to an embodiment of the invention.

An example of a belt used in combination with a charge transport adhesive is depicted in FIG. 10. The belt 30 comprises a substrate 60, having therein, in optional embodiments, conductive fillers 61. The belt contains seam 31 having an adhesive 63 positioned between the seam members 64 and 65. In an optional embodiment of the invention, an overcoat 66 is provided on the substrate 60. The overcoat may contain conductive fillers 67. Conductive fillers 61 optionally dispersed or contained on the substrate, and fillers 67 optionally dispersed or contained in the optional overcoat, may be the same or different.

The adhesive herein provides an excellent seam adhesive for belts, and in embodiments, polyimide intermediate transfer belts. The adhesive, in embodiments, has the same or similar mechanical and surface release properties as the substrate. Further, the adhesive, in embodiments, provides good bonding strength to the substrate seam members. In addition, because of the thermal properties of the adhesive system, the adhesive allows for curing at a relatively low temperature. This prevents distortions within the seam area caused by differential shrinkage between the adhesive and the substrate materials.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

The charge transport adhesive composition was prepared as follows. A mixture of about 1 gram of N,N'-diphenyl-N, N'-bis(m-methylphenyl)-(1,1'-biphenyl)-4,4'-diamine (m-TBD), 0.02 grams of CAT 196, 1.86 grams of ULTEM®, and 21 grams of methylene chloride in an amber bottle were roll milled until complete dissolution of the solids was achieved. The resulting composition had a solid composition of about 35 percent m-TBD, 65 percent ULTEM® and 2 percent catalyst by weight of m-TBD. The resulting adhesive composition was applied to a puzzle cut seam using a syringe. The seamed sample was placed in a forced air oven and the adhesive cured at about 100° C. for approximately 30 minutes.

Example 2

The procedure for Example 1 was repeated with the exception that an amount of 0.03 grams of CAT 196 was used.

Example 3

The procedure for Example 1 was repeated with the exception that an amount of 0.01 grams of CAT 196 and 0.5 grams of m-TBD were used.

Example 4

The procedure for Example 1 was repeated with the exception that an amount of 0.03 grams of CAT 196 and 1.5 grams of m-TBD were used.

Example 5

The procedure for Example 1 was repeated with the exception that an amount of 0.04 grams of CAT 196 and 2.0 grams of m-TBD were used.

The results are shown in Table 1 below. The results demonstrate that the seam strength is superior using the adhesive of the present invention comprising a charge transport molecule.

TABLE 1

| Sample | Binder (g) | m-TBD (g) | CAT 196 (g) | Methylene Chloride (g) | Seam Strength (lb/in) |
|---|---|---|---|---|---|
| 1 | 1.86 | 1.0 | 0.02 | 21.0 | 10.6 |
| 2 | 1.86 | 1.0 | 0.03 | 21.0 | 9.6 |
| 3 | 1.86 | 0.5 | 0.01 | 21.0 | 8.1 |

TABLE 1-continued

| Sample | Binder (g) | m-TBD (g) | CAT 196 (g) | Methylene Chloride (g) | Seam Strength (lb/in) |
|---|---|---|---|---|---|
| 4 | 1.86 | 1.5 | 0.03 | 21.0 | 8.0 |
| 5 | 1.86 | 2.0 | 0.04 | 21.0 | 9.0 |

While the invention has been described in detail with reference to specific and preferred embodiments, it will be appreciated that various modifications and variations will be apparent to the artisan. All such modifications and embodiments as may readily occur to one skilled in the art are intended to be with the scope of the appended claims.

We claim:

1. An endless seamed flexible belt comprising a first end and a second end which join to form a seam, each of the first end and the second end comprising a plurality of mutually mating elements which join in an interlocking relationship to form a seam, the seam comprising an adhesive comprising a material selected from the group consisting of an oxidized charge transport molecule, a charge transport molecule, and mixtures thereof.

2. An endless seamed flexible belt in accordance with claim 1, wherein said adhesive comprises an oxidized charge transport molecule.

3. An endless seamed flexible belt in accordance with claim 2, wherein said oxidized charge transport molecule comprises an oxidized arylamine salt.

4. An endless seamed flexible belt in accordance with claim 2, wherein said oxidized charge transport molecule comprises an oxidized oligo arylamine salt.

5. An endless seamed flexible belt in accordance with claim 3, wherein said oxidized arylamine salt is of a formula selected from the group consisting of:

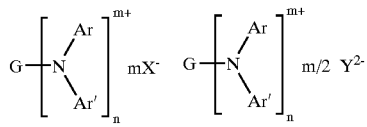

and mixtures thereof, wherein G is an aromatic group with from about 6 to about 24 carbon atoms and connects to all the diarylamine groups, Ar and Ar' are substituted or unsubstituted aromatic groups with from about 6 to about 18 carbon atoms, n is an integer of from about 2 to about 36, m is an integer which is less than or equal to n, $X^-$ is a monovalent counter anion selected from the group consisting of $BF_4^-$, $PF_6^-$, $AsF_6^-$, $SbF_6^-$, $ClO_4^-$, $AuCl_4^-$, $C_{60}^-$, $I^-$, $Br_3^-$, $I_3^-$, $FeCl_4^-$, $SnCl_5^-$, $PO_3^-$, $(CF_3SO_3)_4Al^-$, $(CF_3SO_3)_4Ga^-$, $(CF_3SO_3)_4Ta^-$, $(CF_3SO_3)_4B^-$, trifluoroacetate, benzoate, nitrobenzoate, toluenesulfonate, p-bromobenzenesulfonate, p-nitrobenzenesulfonate, trifluoromethanesulfonate, nonafluorobutanesulfonate, 2,2,2-trifluoroethanesulfonate, tetraphenylborate, anionic tetracyanoquinodimethane, and bis(trifluoromethanesulfonyl)imide, and $Y^{2-}$ is a divalent counter anion selected from the group consisting of $SiF_6^{2-}$, $GeF_6^{2-}$, $TiF_6^{2-}$, $TaF_7^{2-}$, $NbF_7^{2-}$, $RuCl_6^{2-}$, $OsCl_6^{2-}$, $IrCl_6^{2-}$, $PdCl_4^{2-}$, $PdCl_6^{2-}$, $PdI_4^{2-}$, $PtCl_4^{2-}$, $PtCl_6^{2-}$, $PtBr_6^{2-}$, $IrCl_6^{2-}$, $ZrF_6^{2-}$, benzenedisulfonate, squarate, $B_{12}H_{12}^{2-}$, and $C_{60}^{2-}$.

6. An endless seamed flexible belt in accordance with claim 5, wherein said oxidized arylamine salt has the following formula:

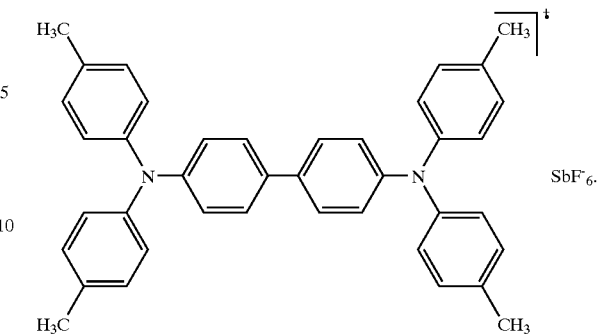

7. An endless seamed flexible belt in accordance with claim 2, wherein said adhesive further comprises a charge transport molecule and a polymer binder.

8. An endless seamed flexible belt in accordance with claim 7, wherein said polymer binder is selected from the group consisting of polystyrenes, polycarbonates, polysiloxanes, polyesters, polyimides, polyurethanes, polysulfones, polyethersulfones, polyether ketones, polyamides and mixtures thereof.

9. An endless seamed flexible belt in accordance with claim 8, wherein said polymer binder is a polyimide.

10. An endless seamed flexible belt in accordance with claim 7, wherein said charge transport molecule is selected from the group consisting of N,N'-diphenyl-N,N'-bis(m-methylphenyl)-(1,1'-biphenyl)-4,4'-diamine and N,N,N',N'-tetra-p-tolyl-1,1'-biphenyl-4,4'-diamine.

11. An endless seamed flexible belt in accordance with claim 2, wherein said adhesive further comprises a charge transport polymer.

12. An endless seamed flexible belt in accordance with claim 11, wherein said charge transport polymer is selected from the group consisting of polyether carbonate, polyvinylcarbazole, triarylamine doped polycarbonate, triphenylamine-containing poly(N-methylacrylimide), polysilane, and mixtures thereof.

13. An endless seamed flexible belt in accordance with claim 1, wherein said adhesive comprises a charge transport molecule.

14. An endless seamed flexible belt in accordance with claim 13, wherein said charge transport molecule is selected from the group consisting of N,N'-diphenyl-N,N'-bis(m-methylphenyl)-(1,1'-biphenyl)-4,4'-diamine and N,N,N',N'-tetra-p-tolyl-1,1'-biphenyl-4,4'-diamine.

15. An endless seamed flexible belt in accordance with claim 13, wherein said adhesive further comprises a photoacid and a polymer binder.

16. An endless seamed flexible belt in accordance with claim 15, wherein said polymer binder is selected from the group consisting of polystyrenes, polycarbonates, polysiloxanes, polyesters, polyimides, polyurethanes, polysulfones, polyethersulfones, polyether ketones, polyamides and mixtures thereof.

17. An endless seamed flexible belt in accordance with claim 16, wherein said polymer binder is a polyimide.

18. An endless seamed flexible belt in accordance with claim 15, wherein said photoacid is selected from the group consisting of di(p-t-butylphenyl) iodonium hexafluoroarsenate, ex-sulfonyloxyketones, 2,6-dinitrobenzyl mesylate, 2,6-dinitrobenzyl pentafluorobenzenesulfonate, nitrobenzyl-triphenylsilylether, phenyl naphthoquininediazide-4-sulfonate, 2-phenyl-4,6-bis-trichloromethyl-s-triazine, and mixtures thereof.

19. An endless seamed flexible belt in accordance with claim 13, wherein said adhesive further comprises a photoacid and an ultraviolet curable material.

20. An endless seamed flexible belt in accordance with claim 19, wherein said photoacid is selected from the group consisting of di(p-t-butylphenyl) iodonium hexafluoroarsenate, α-sulfonyloxyketones, 2,6-dinitrobenzyl mesylate, 2,6-dinitrobenzyl pentafluorobenzenesulfonate, nitrobenzyltriphenylsilylether, phenyl naphthoquininediazide-4-sulfonate, 2-phenyl-4,6-bis-trichloromethyl-s-triazine, and mixtures thereof.

21. An endless seamed flexible belt in accordance with claim 19, wherein said ultraviolet curable material is selected from the group consisting of acrylates, methacrylates, epoxies, vinyl monomers, epoxy acrylates, urethane acrylates, polyether urethane acrylates, polyester acrylates, polyether acrylates, acrylated oils, thiols, and mixtures thereof.

22. An image forming apparatus for forming images on a recording medium comprising:

a charge-retentive surface to receive an electrostatic latent image thereon;

a development component to apply toner to the charge-retentive surface to develop the electrostatic latent image to form a developed image on said charge retentive surface;

a transfer belt to transfer the developed image from the charge retentive surface to a copy substrate, wherein the transfer belt is an endless seamed flexible belt comprising a first end and a second end which join to form a seam, each of the first end and the second end comprising a plurality of mutually mating elements which join in an interlocking relationship to form a seam, the seam having an adhesive comprising a material selected from the group consisting of an oxidized charge transport molecule, a charge transport molecule and mixtures thereof;

and a fixing component to fuse the developed image to the copy substrate.

* * * * *